United States Patent
Titensor et al.

(10) Patent No.: US 12,480,763 B2
(45) Date of Patent: Nov. 25, 2025

(54) LIGHTWEIGHT LASER DESIGNATOR SYSTEMS AND METHODS

(71) Applicant: Teledyne FLIR Defense, Inc., Thousand Oaks, CA (US)

(72) Inventors: Matthew Titensor, Orem, UT (US); Nathan Knoebel, Orem, UT (US); Jerel B. Nielsen, Orem, UT (US)

(73) Assignee: Teledyne FLIR Defense, Inc., Thousand Oaks, CA (US)

( * ) Notice: Subject to any disclaimer, the term of this patent is extended or adjusted under 35 U.S.C. 154(b) by 1053 days.

(21) Appl. No.: 17/492,542

(22) Filed: Oct. 1, 2021

(65) Prior Publication Data
US 2025/0216195 A1    Jul. 3, 2025

Related U.S. Application Data

(60) Provisional application No. 63/087,166, filed on Oct. 2, 2020.

(51) Int. Cl.
*G01C 3/00* (2006.01)
*B64U 10/13* (2023.01)
(Continued)

(52) U.S. Cl.
CPC .............. *G01C 3/00* (2013.01); *G01C 3/06* (2013.01); *G01S 17/48* (2013.01); *B64U 10/13* (2023.01);
(Continued)

(58) Field of Classification Search
CPC .. G01C 3/00; G01C 3/06; G01S 17/48; B64U 2101/30; B64U 2201/20; B64U 10/13; B64U 10/25
(Continued)

(56) References Cited

U.S. PATENT DOCUMENTS

| | | |
|---|---|---|
| 7,541,588 B2 | 6/2009 | Tabirian et al. |
| 8,022,343 B2 | 9/2011 | Solenne |

(Continued)

FOREIGN PATENT DOCUMENTS

JP    S62175683    8/1987

OTHER PUBLICATIONS

Steiner MCID Beacon, Retrieved on Internet: https://www.steiner-optics.com/beacons/mcid-beacon, 2017, 3 pages.

(Continued)

*Primary Examiner* — Daniel L Murphy
(74) *Attorney, Agent, or Firm* — Haynes and Boone, LLP

(57) ABSTRACT

Laser designator systems (laser designator systems) and related techniques are provided to improve the operational flexibility of unmanned aerial vehicles (UAVs). A laser designator system includes an imaging module configured to image a scene according to a first field of view (FOV) of the imaging module; a laser spot tracker configured to detect a plurality of PRF encoded laser spots disposed within the scene and to provide a corresponding plurality of angular positions of the plurality of PRF encoded laser spots within a second FOV of the laser spot tracker; and an optical datum faceplate coupled to and configured to optically align the imaging module and the laser spot tracker to each other and a boresight for the laser designator system defined by the optical datum faceplate.

20 Claims, 17 Drawing Sheets

(51) Int. Cl.
*G01C 3/06* (2006.01)
*G01S 17/48* (2006.01)
*B64U 10/25* (2023.01)
*B64U 101/30* (2023.01)

(52) U.S. Cl.
CPC .......... *B64U 10/25* (2023.01); *B64U 2101/30* (2023.01); *B64U 2201/20* (2023.01)

(58) Field of Classification Search
USPC ........................................................ 356/3.02
See application file for complete search history.

(56) References Cited

U.S. PATENT DOCUMENTS

| | | |
|---|---|---|
| 8,159,680 B2 | 4/2012 | Robinson et al. |
| 9,857,145 B1 | 1/2018 | Rutkiewicz et al. |
| 9,877,775 B2 | 1/2018 | Hart |
| 9,897,688 B2 * | 2/2018 | Choiniere .............. G01S 17/18 |
| 9,996,748 B2 | 6/2018 | Way et al. |
| 10,126,101 B2 | 11/2018 | Ell |
| 10,397,499 B2 | 8/2019 | Shigeta et al. |
| 10,972,648 B2 | 4/2021 | Strand |
| 11,323,687 B2 | 5/2022 | Lacaze et al. |
| 2003/0155513 A1 | 8/2003 | Remillard et al. |
| 2012/0150589 A1 | 6/2012 | Xian et al. |
| 2013/0087684 A1 | 4/2013 | Guetta et al. |
| 2015/0273863 A1 | 10/2015 | Stowe et al. |
| 2015/0286340 A1 | 10/2015 | Send et al. |
| 2015/0363646 A1 | 12/2015 | Way et al. |
| 2018/0080740 A1 | 3/2018 | Ell |
| 2018/0102442 A1 * | 4/2018 | Wang .................... H10F 77/147 |
| 2019/0094149 A1 | 3/2019 | Troy et al. |
| 2020/0110177 A1 | 4/2020 | Kamisada et al. |
| 2020/0264279 A1 | 8/2020 | Patel et al. |
| 2020/0296304 A1 | 9/2020 | Strand et al. |

OTHER PUBLICATIONS

Steiner Star Beacon, Retrieved on Internet: https://www.steiner-defense.com/beacons/star-beacon, 2017, 3 pages.
Steiner Nova Beacon, Retrieved on Internet: https://www.steiner-defense.com/beacons/nova-beacon, 2017, 3 pages.
Rock West Solutions IR Beacons, Retrieved on Internet: https://www.rockwestsolutions.com/sensors/eo-ir-sensors/signal-detection-ir-beacons/, 2017, 3 pages.
DRS Daylight Solutions INCA™ Multispectral Proximity Beacon, Retrieved on Internet: https://www.daylightsolutions.com/product/inca/, 2017, 3 pages.
Cejay Engineering's Portable Thermal Beacon, Retrieved on Internet: https://www.cejayengineering.com/thermal-identification/portable-thermal-beacon-ptb-detail, 2014, 5 pages.

* cited by examiner

Laser Safety Settings

| | | |
|---|---|---|
| ☑ | Laser safety shutoff delay (s) | 5 |
| ☑ | GCS comm Timeout (ms) | 5000 |
| ☐ | LRF range update timeout (ms) | 5000 |
| ☑ | Aircraft telemetry timeout (ms) | 5000 |
| ☐ | Aircraft 3D geofence radius (m) | 50 |
| ☐ | Aircraft minimum distance to home (m) | 5 |
| ☐ | Target 2D geofence radius (m) | 20 |
| ☐ | Target minimum distance to home (m) | 50 |
| ☐ | Maximum target elevation angle (deg) | 90 |
| ☐ | Check navigation state? | |

[ OK ]  [ Cancel ]

FIG. 6D

LIGHTWEIGHT LASER DESIGNATOR SYSTEMS AND METHODS

CROSS-REFERENCE TO RELATED APPLICATIONS

This application claims priority to and the benefit of U.S. Provisional Patent Application No. 63/087,166 filed Oct. 2, 2020 and entitled "LIGHTWEIGHT LASER DESIGNATOR SYSTEMS AND METHODS," which is incorporated herein by reference in its entirety.

TECHNICAL FIELD

The present invention relates generally to laser designators and, more particularly, to systems and methods for tactical laser designator payloads for relatively lightweight unmanned aircraft.

BACKGROUND

Modern unmanned aircraft systems (UASs), which may include one or a variety of different unmanned aerial vehicles (UAVs), are often expected to operate over long distances and in all types of environments: rural, urban, and over other populated and/or unpopulated areas. Operation of systems incorporating such unmanned flight platforms may include real-time wireless transmissions between the platform and a remote base station, which may itself include a display to efficiently convey telemetry, imagery, and/or other sensor data captured by the platform to an operator. An autopilot or an operator may pilot or otherwise assist in or guide control of an unmanned flight platform throughout an entire mission relying solely on received data provided by the unmanned platform.

Conventional laser designator sensor payloads are too large, heavy, and power hungry for relatively lightweight unmanned aircraft, particularly in the context of long duration surveys and/or tactical deployments. Thus, there is a need for relatively lightweight and power efficient laser designator systems and techniques for use with UASs.

SUMMARY

Unmanned aerial vehicle (UAV) deployable laser designator systems and related techniques are provided to improve the operation of unmanned flight platforms. One or more embodiments of the described UAV laser designator systems may advantageously include a laser target marker configured to generate and light a target with a coded laser beam and a laser spot tracker configured to detect and identify coded laser beams within its field of view. Both the laser target marker and the laser spot tracker may be mounted to a relatively lightweight optical datum forming a front face of the laser designator system. Embodiments may also include an orientation and/or position sensor to measure dynamic motion of the laser designator system, a payload controller to control operation of the laser designator system, and one or more additional sensors to measure and provide sensor data corresponding to maneuvering and/or other operation of the flight platform and/or the laser designator system. In various embodiments, such additional sensors may include one or more visible spectrum and/or infrared cameras and/or other remote sensor systems coupled to the flight platform and/or integrated with the laser designator system.

In one embodiment, a system includes an imaging module configured to image a scene according to a first field of view (FOV) of the imaging module; a laser target marker configured to generate and project a pulse repetition frequency (PRF) encoded laser beam towards the scene and within the first FOV of the imaging module; a laser spot tracker configured to detect a PRF encoded laser spot generated by the PRF encoded laser beam within the scene and provide an angular position of the PRF encoded laser spot within a second FOV of the laser spot tracker; and an optical datum faceplate coupled to and configured to optically align the imaging module, the laser target marker, and the laser spot tracker to each other and to a boresight for the laser designator system defined by the optical datum faceplate.

In another embodiment, a system includes an imaging module configured to image a scene according to a first field of view (FOV) of the imaging module; a laser spot tracker configured to detect a plurality of PRF encoded laser spots disposed within the scene and to provide a corresponding plurality of angular positions of the plurality of PRF encoded laser spots within a second FOV of the laser spot tracker; and an optical datum faceplate coupled to and configured to optically align the imaging module and the laser spot tracker to each other and a boresight for the laser designator system defined by the optical datum faceplate.

In another embodiment, a method includes controlling a laser target marker to initiate a PRF encoded laser beam; receiving a series of laser pulse trigger signals corresponding to each pulse of the PRF encoded laser beam; determining at least one laser pulse repetition period between adjacent pulses of the PRF encoded laser beam based, at least in part, on the received series of laser pulse trigger signals; determining at least one predicted laser pulse emission time based, at least in part, on the determined at least one laser pulse repetition period; and enabling a laser spot tracker at least one hundred light-meters after the predicted laser pulse emission time.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 6A-6D illustrate display views associated with a laser designator system in accordance with embodiments of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

Modern unmanned aerial vehicles (UAVs) may be tasked to operate over long distances and in all environments. Propulsion systems for UAVs have become more efficient over time, but such systems typically expend the majority of the available power in order to stay aloft, particularly when weighted down by a relatively heavy sensor payload. Conventional laser designator systems use substantial amounts of power in order to generate reliable laser beam for the typical desired duration, and they tend to be designed as heavy in order to dampen vibrations and to provide sufficient alignment between various integrate optical devices. As such, conventional laser designator systems are not compatible with relatively lightweight (e.g., class 1) UAVs. Embodiments described herein address the conflicting operational needs of UAV propulsion systems and laser designator systems.

For example, embodiments of the laser designator systems described herein may include an optical datum implemented as a faceplate for the laser designator system in order to reduce weight otherwise dedicated to an optical datum and a separate housing. Moreover, the optical datum faceplate described herein includes various kinematic mounting structures configured to maximize stiffness and optical alignment between various optical elements of the laser designator system while reducing overall weight of the laser designator system. In Additional embodiments may be configured to operate according to various methodologies facilitating unmanned flight of the laser designator system via relatively lightweight UAVs, such as remote safety interlocks and operational capabilities and corresponding display views to increase situational awareness of a remote operator, as described herein.

Figure 1:
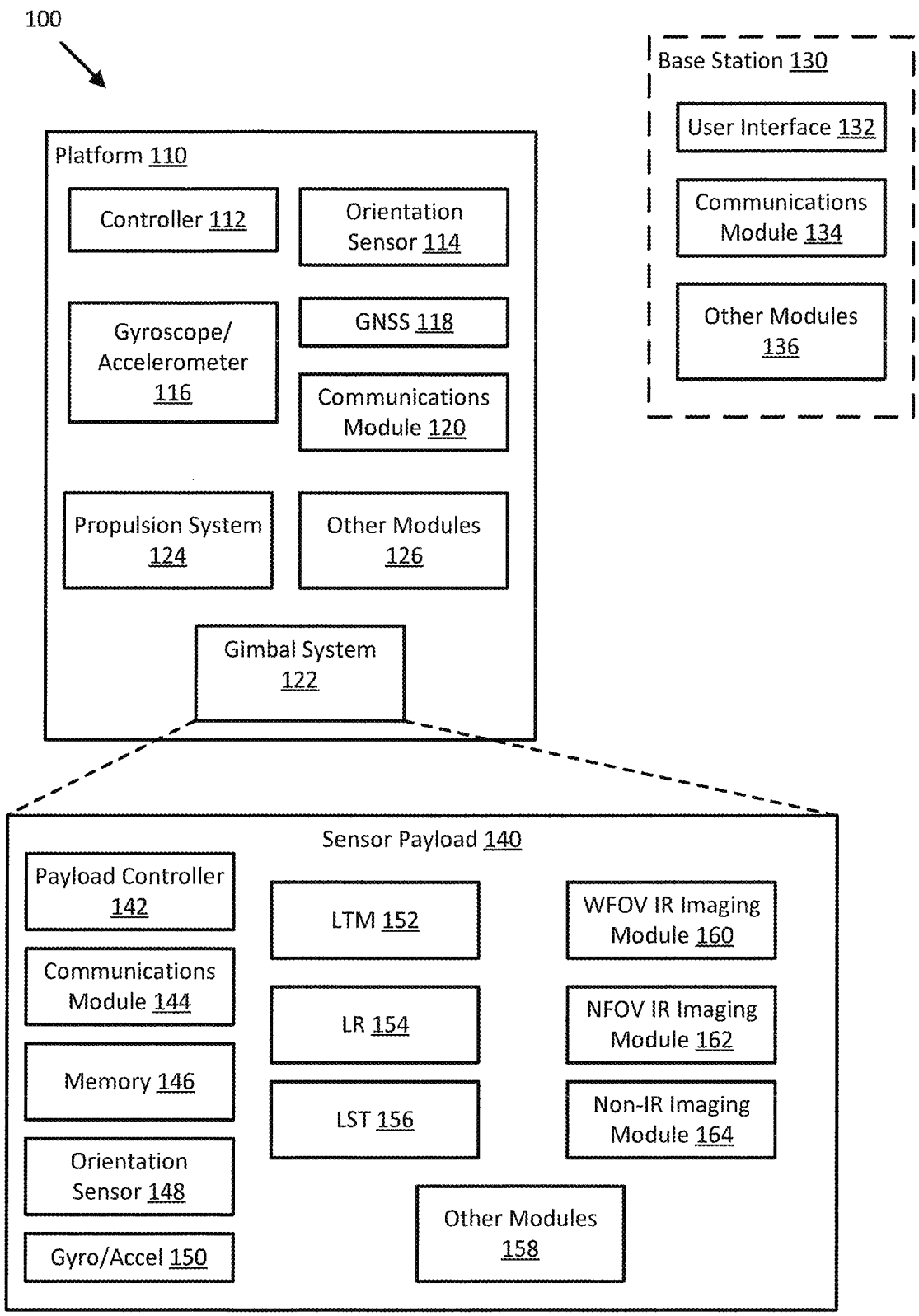
FIG. 1 illustrates a block diagram of an unmanned aircraft system (UAS) including an unmanned aerial vehicle (UAV) laser designator system in accordance with an embodiment of the disclosure.

FIG. 1 illustrates a block diagram of an unmanned aircraft system (UAS) 100 including an unmanned aerial vehicle (UAV) laser designator system/sensor payload 140 coupled to a UAV platform 110 in accordance with an embodiment of the disclosure. In some embodiments, system 100 may be configured to fly over a scene, through a structure, or approach a target and image or sense or designate the scene, structure, or target, or portions thereof, using gimbal system 122 to aim laser designator system/sensor payload 140 at the scene, structure, or target, or portions thereof. Resulting imagery and/or other sensor data may be processed (e.g., by sensor payload 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis.

In various embodiments, system 100 may be configured to use such imagery and/or sensor data to control operation of platform 110 and/or sensor payload 140, as described herein, such as controlling gimbal system 122 to aim sensor payload 140 towards a particular direction or controlling propulsion system 124 to move platform 110 to a desired position in a scene or structure or relative to a target. In all operational embodiments, system 100 may be configured to use such imagery and/or related sensor data to detect a target, for example, and to use laser designator system 140 to light a target with a coded laser beam, as described herein.

In the embodiment shown in FIG. 1, UAS 100 includes platform 110, optional base station 130, and at least one laser designator system 140. In general, platform 110 may be a mobile platform configured to move or fly and position payload 140 and/or platform 110 (e.g., relative to a designated or detected target). As shown in FIG. 1, platform 110 may include one or more of a controller 112, an orientation sensor 114, a gyroscope/accelerometer 116, a global navigation satellite system (GNSS) 118, a communications module 120, a gimbal system 122, a propulsion system 124, and other modules 126. Sensor payload 140 may be physically coupled to platform 110 and be configured to capture sensor data (e.g., visible spectrum images, infrared images, narrow aperture radar data, analyte sensor data, orientation/attitude and/or position data, and/or other sensor data) of a target position, area, and/or object(s) as selected and/or framed by operation of platform 110 and/or base station 130, for example, and/or associated with maneuvering or navigation of platform 110, as described herein.

Operation of platform 110 may be substantially autonomous and/or partially or completely controlled by optional base station 130, which may include one or more of a user interface 132, a communications module 134, and other modules 136. In other embodiments, platform 110 may include one or more of the elements of base station 130, such as with various types of manned aircraft, terrestrial vehicles, and/or surface or subsurface watercraft. In some embodiments, one or more of the elements of system 100 may be implemented in a combined housing or structure that can be coupled to or within platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or sensor payload 140.

In some embodiments, controller 112 may be configured to substantially continuously monitor and/or store the status of and/or sensor data provided by one or more elements of platform 110, sensor payload 140, and/or base station 130, such as the position and/or orientation of platform 110, sensor payload 140, and/or base station 130, for example, and the status of a communication link established between platform 110, sensor payload 140, and/or base station 130. Such communication links may be configured to be established and then used to transmit data between elements of system 100 substantially continuously throughout operation of system 100, where such data includes various types of sensor data, control parameters, and/or other data.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), optional gimbal system 122, laser designator system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110, for example, (e.g., or an element of platform 110, based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals and/or data from base station 130 and provide them to controller 112 and/or propulsion system 124. In other embodiments, communications module 120 may be configured to receive images and/or other sensor information (e.g., visible spectrum and/or infrared still images or video images) from sensor payload 140 and relay the sensor data to controller 112 and/or base station 130. In further embodiments, communications module 120 may be configured to receive sensor information from laser designator system 140 and relay the sensor data to controller 112 and/or base station 130. In various embodiments, communications module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications.

In some embodiments, communications module 120 may be configured to monitor the status of a communication link established between platform 110, sensor payload 140, and/or base station 130. Such status information may be provided to controller 112, for example, or transmitted to other elements of system 100 for monitoring, storage, or further processing, as described herein. Communication links established by communications module 120 may be configured to transmit data between elements of system 100 substantially continuously throughout operation of system 100, where such data includes various types of sensor data, control parameters, and/or other data, as described herein.

Gimbal system 122 may be implemented as an actuated gimbal mount, for example, that may be controlled by controller 112 to stabilize sensor payload 140 relative to a target or to aim and/or orient sensor payload 140 according to a desired direction and/or relative position. As such, gimbal system 122 may be configured to provide a relative orientation of sensor payload 140 (e.g., relative to an orientation of platform 110) to controller 112 and/or communications module 120 (e.g., gimbal system 122 may include its own orientation sensor 114). In some embodiments, gimbal system may be implemented according to a high bandwidth gimble mount with distributed gimbal control (e.g., <1000 Hz) In other embodiments, gimbal system 122 may be implemented as a gravity driven mount (e.g., non-actuated).

In various embodiments, gimbal system 122 may be configured to provide power, support wired communications, and/or otherwise facilitate operation of articulated sensor/sensor payload 140. As such, gimbal system 122 may be configured to provide a power, telemetry, and/or other sensor data interface between platform 110 and laser designator system 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously. In still further embodiments, gimbal system 122 may be implemented as an actuated release mechanism to decouple and/or drop payload 140 according to control signals provided by controller 112 and/or relayed by communications module 120.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 110 may be configured primarily to provide thrust while other structures of platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100.

In some embodiments, other modules 126 may include one or more actuated and/or articulated devices (e.g., multispectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 126 may include a stereo vision system configured to provide image data that may be used to calculate or estimate a position of platform 110, for example, or to calculate or estimate a relative position of a navigational hazard in proximity to platform 110. In various embodiments, controller 130 may be configured to use such proximity and/or position information to help safely pilot platform 110 and/or monitor communication link quality, as described herein.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., visible spectrum and/or infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause platform 110 to move according to the target heading, route, and/or orientation, or to aim sensor payload 140 accordingly. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., sensor payload 140) associated with platform 110, for example, and to generate control signals for adjusting an orientation and/or position of the actuated device according to the target attitude, orientation, and/or position. Such control signals may be transmitted to controller 112 (e.g., using communications modules 134 and 120), which may then control platform 110 and/or elements of platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from sensor payload 140. In some embodiments, communications module 134 may be configured to support spread spectrum transmissions, for example, and/or multiple simultaneous communications channels between elements of system 100. In various embodiments, communications module 134 may be configured to monitor the status of a communication link established between base station 130, sensor payload 140, and/or platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, an analyte sensor system, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as a water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

As shown in FIG. 1, laser designator system/sensor payload 140 may include payload controller 142, communications module 144, memory 146, orientation sensor 148, gyroscope/accelerometer 150, laser target marker 152, laser rangefinder 154, laser spot tracker 156, wide field of view (FOV) infrared imaging module 160, narrow FOV infrared imaging module 162, optional non-infrared (e.g., visible spectrum, ultraviolet, multi-spectrum) imaging module 164, and/or other modules 158. In various embodiment the various optical elements of sensor payload 140 may be aligned with each other according to an optical datum implemented as a faceplate for sensor payload 140, for example, as described herein. Moreover, each of payload controller 142, communications module 144, orientation sensor 148, and/or gyroscope/accelerometer 150, may be implemented similarly to controller 112, communications module 120, orientation sensor 114, and/or gyroscope/accelerometer 150, respectively, and may include similar characteristics and operational capabilities.

In general, laser designator system 140 may be configured to use one or more of laser target marker 152, laser rangefinder 154, laser spot tracker 156, wide field of view (WFOV) IR imaging module 160, narrow field of view (NFOV) IR imaging module 162, and/or optional non-IR imaging module 164 to acquire range, geolocate, track, and mark/designate targets of interest in an area in view of laser designator system 140 and/or UAV 110. In some embodiments, laser designator system 140 may be able to monitor and/or mark targets of interest that are up to 10 km away, for example, or 30 km away (e.g., when using a relatively high power laser target marker 152). In addition, laser designator system 140 may be configured to spatially locate and decode externally laser marked targets (e.g., by $3^{rd}$ parties), such as for battlefield assessment, localization, handoff, and/or other tactical applications. Embodiments of laser designator system 140 may be able to provide this functionality in a sub 4 lb package thereby allowing its use with man-packable UASs. Laser designator system 140 may be adapted to enhance tactical unit protection and performance in complex terrain, where deploying platform 110 is more efficient and safe than alternative means.

Laser target marker 152 may be implemented as any laser beam generator capable of generating a pulse repetition frequency (PRF) encoded laser beam with sufficient power to mark a designated target at least 500 m away and up to 30 km away from a position of platform 110. In some embodiments, laser target marker 152 may be implemented as a 1064 nm laser beam generator, for example, and be configured to generate beams from 15 mJ to 50 mJ in energy for approximately 10 seconds at a time. In some embodiments, laser target marker 152 may be implemented by a passively cooled control and diode driver module and a laser resonator assembly driven by the laser driver.

Laser rangefinder 154 may be implemented as any laser emitting and ranging sensor system. In some embodiments, laser rangefinder 154 may be configured to use a 1550 nm wavelength laser and operate in a continuous mode; it samples range data at 1-2 Hz. Laser rangefinder 154 may be active whenever gimbal system 122 is powered. When laser rangefinder 154 reports good range data, this data may be displayed in the lower left corner of a display view reproducing the video stream. A range overlay may be preceded with an "L" to indicate that this range data is generated by laser rangefinder 154. If laser rangefinder 154 cannot get a good range estimate, laser designator system 140 may be configured to resort to inertial range estimation, as described herein. Laser designator system 140 may be configured to use various navigation sensors of UAV 110 and/or laser designator system 140 and a state solution to estimate where gimbal system 122 and/or laser designator system 140 is pointed; this may be combined with position data and/or local terrain/chart data to give a range estimation. A range overlay may change to be proceeded preceded with an "I" to indicate inertial range estimation.

If terrain data is unavailable, laser designator system 140 may be configured to assume a flat-earth model and display the inertial range as such. This has the potential to give range estimations in excess of actual target range, such as when looking at tall buildings, hillsides, trees, etc. Laser rangefinder 154 generates returns off the face of these objects, whereas an inertial estimate "sees through" these objects; it will report a range that intersects with the ground behind any object. To generate accurate geolocation data, ensure that laser rangefinder 154 is reporting range data and/or align laser designator system 140 with flat ground nearest to the target.

Laser spot tracker 156 may be implemented as a highly sensitive photo-detector tuned to the 1064 nm band of the IR spectrum and be configured to detect, decode, and report the position of a laser spot at ranges >10 km and with position accuracies near 1 mrad. In various embodiments, laser spot tracker 156 may be configured to detect $3^{rd}$ party laser energy (laser spots and reflections emanating from other laser devices) and provide confirmation of good laser operation for self-designations/marking, as disclosed herein.

When laser designator system 140 is not actively firing laser target marker 152, laser spot tracker 156 is automatically set to a high sensitivity state. If pulsed laser energy is present in its FOV, laser spot tracker 156 will lock to the pulse and report its PRF code. The PRF code may be listed in a display view associated with operation of laser designator system 140, as described herein. Depending on the location of the energy in the FOV, laser spot tracker 156 may be configured to report position information. For example, system 100 may be configured to generate a display view including an overlay corresponding to the detected position of the laser energy. In various embodiments, laser spot tracker 156 may be configured to track up to 4 independent laser spots at any given time.

In some embodiments, laser spot tracker 156 may have a 9-degree FOV across which accurate position information may be derived. While sensitive to laser energy and still capable of providing PRF codes; energy positions outside this 9° FOV will be reported in one of four quadrants (e.g., as separated by crosshairs rendered within a corresponding display view). For example, an overlay may appear with an arrow indicating which quadrant the energy is observed from. System 100 and/or a user may be configured to adjust gimbal system 122 to aim laser designator system 140 toward that quadrant until the spot is observed in the FOV with accurate position information. If a geo-coordinate of the laser spot is desired, the crosshairs may be centered on overlay position associated with laser spot tracker 156. The target location reported by laser designator system 140 will then coincide with the laser spot.

The primary function of laser spot tracker 156 is to confirm laser operation. Laser spot tracker 156 may watch for reflected laser energy to return from a target; this light energy is decoded, and a position determined, as described herein. The code is checked against a desired PRF; if it matches, the PRF is reported to the user and crosshair ticks are turned on in a corresponding display view. A reported PRF code from a self-designation/marking may appear RED in a PRF list to differentiate between other potential PRF detections (which may be rendered white). Active crosshair ticks indicate laser target marker 152 is firing, sufficient laser energy is reflecting from the target, and the proper PRF code is being sent and received: the target is being sufficiently lased.

Several instances may occur when laser target marker 152 is properly firing but laser spot tracker 156 is not getting proper readings. For example, when laser target marker 152 emits a pulse, there is enough energy to cause the air to glow and reflect laser light. Due to the highly sensitive nature of laser spot tracker 156, this air-flash can potentially blind laser spot tracker 156 and/or be reported as a detection. Laser designator system 140 may be configured to prevent laser spot tracker 156 from detecting any light until the laser pulse has had enough time to travel away from payload 140; this gating mode ensures detections by laser spot tracker 156 are from true target reflections. Because air-flash is possible in dusty & foggy conditions out to 200-300 meters, laser spot tracker 156 will generally not see its own laser reflected closer than that range.

Alternatively, if a target does not reflect enough light for laser spot tracker 156 to detect, laser spot tracker 156 will simply show no detections. The most common reasons for no detections include: excessive range to target; specular target surface—highly reflective surfaces may not scatter light back towards laser designator system 140; low reflectivity targets. It is important to note that in the above situations, laser target marker 152 is still firing properly.

In addition to confirming proper PRF code and reflected energy, laser spot tracker 156 may be configured to constantly check the laser position in relation to the crosshairs rendered in a display view. If laser spot tracker 156 detects consistently off-axis laser spots, it will report to the user to "Check Laser Boresight" as an error message. If the message is consistent, the boresight of laser designator system 140 should be checked and/or corrected. Some other conditions may cause an off-axis reading even though the boresight is still good: scattered laser spot—targets may scatter laser energy to the side; highly reflective targets—if laser spot tracker 156 receives too much laser energy from close and highly reflective targets, laser spot tracker 156 may saturate and lose positional accuracy.

Each of imaging modules 160-164 may be implemented as a cooled and/or uncooled array of detector elements, such as visible spectrum and/or infrared (IR) sensitive detector elements, including quantum well infrared photodetector elements, bolometer or microbolometer based detector elements, type II superlattice based detector elements, and/or other infrared spectrum detector elements that can be arranged in a focal plane array. In one embodiment, wide FOV IR imaging module 160 may be implemented as a LWIR or thermal camera with an FOV of approximately 24 degrees, or between 20 and 30 degrees, and narrow FOV IR imaging module 162 may be implemented as an LWIR or thermal camera with an FOV of approximately 5.8 degrees, or between 5 and 10 degrees. In some embodiments, optional non-infrared imaging module 164 may include detector elements configured to detect other electromagnetic spectrums, such as visible light, ultraviolet, and/or other electromagnetic spectrums or subsets of such spectrums.

In various embodiments, each of imaging modules 160-164 may be calibrated or registered to each other such that images captured by each imaging module occupy a known and at least partially overlapping field of view of the other imaging modules, thereby allowing different images (e.g., different FOV images, different spectrum images) to be geospatially registered to each other (e.g., by scaling and/or positioning). In some embodiments, different images may be registered to each other using pattern recognition processing in addition or as an alternative to reliance on a known overlapping field of view. Each of imaging modules 160-164 may include one or more logic devices (e.g., similar to controller 112) that can be configured to process imagery captured by detector elements of imaging modules 160-164 before providing the imagery to payload controller 142, memory 146, and/or communications module 144. More generally, imaging modules 160-164 may be configured to perform any of the operations or methods described herein, at least in part, or in combination with controller 112, payload controller 142, and/or user interface 132.

Communications module 144 of sensor payload 140 may be implemented as any wired and/or wireless communications module configured to transmit and receive analog and/or digital signals between elements of system 100. For example, communications module 144 may be configured to transmit infrared/thermal and/or other spectrum images from imaging modules 160-164 to communications module 120 or 134. In other embodiments, communications module 144 may be configured to receive control signals (e.g., control signals directing capture, focus, selective filtering, and/or other operation of sensor payload 140) from controller 112 and/or user interface 132. In some embodiments, communications module 144 may be configured to support spread spectrum transmissions, for example, and/or multiple simultaneous communications channels between elements of system 100. In various embodiments, communications module 144 may be configured to monitor the status of a communication link established between sensor payload 140, base station 130, and/or platform 110 (e.g., including packet loss of transmitted and received data between elements of system 100, such as with digital communication links), as described herein. Such status information may be provided to various elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging modules 160-164, and/or other elements of sensor payload 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100.

Other modules 158 of sensor payload 140 may include other and/or additional sensors, actuators, communications modules/nodes, cooled or uncooled optical filters, and/or user interface devices used to provide additional environmental information associated with sensor payload 140, for example. In some embodiments, Other modules 158 may include a humidity sensor, a wind and/or water temperature sensor, a barometer, a radar system, a visible spectrum camera, an infrared camera, a GNSS, an analyte sensor system, and/or other environmental sensors providing measurements and/or other sensor signals that can be displayed to a user and/or used by imaging modules 160-164 or other devices of system 100 (e.g., controller 112) to provide operational control of platform 110 and/or system 100 or to process imagery to compensate for environmental conditions.

Payload controller 142 may be configured to receive control signals and/or telemetry from platform 110 (e.g., via communications modules 120/144 and/or gimbal system 122), for example, and/or to receive telemetry from sensors integrated with payload 140 (e.g., orientation sensor 148, gyroscope/accelerometer 150, other modules 158), and control operation of any of the various elements of sensor payload 140 and/or gimbal system 122. In some embodiments, payload controller 142 may be configured to control operation of platform 110 independent of base station 130 and/or other elements of system 100.

More generally, payload controller 142 may be implemented as one or more of any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of laser designator system 140 and/or other elements of laser designator system 140, for example. Such software instructions may also implement methods for processing sensor signals, determining sensor information, providing user feedback (e.g., through user interface 132 via communications through gimbal system 122 and/or communications module 120), querying devices for operational parameters, selecting operational parameters for devices, or performing any of the various operations described herein.

In addition, a non-transitory medium may be provided for storing machine readable instructions for loading into and execution by payload controller 142, and such non-transitory medium may be implemented as internal and/or external memory and/or associated interfaces. In these and other embodiments, payload controller 142 may be implemented with other components where appropriate, such as volatile memory, non-volatile memory, one or more interfaces, and/or various analog and/or digital components for interfacing with modules of laser designator system 140 and/or devices of system 100. For example, payload controller 142 may be adapted to store sensor signals, sensor information, parameters for coordinate frame transformations, calibration parameters, sets of calibration points, and/or other operational parameters, over time, for example, and provide such stored data to a user using user interface 132. In some embodiments, payload controller 142 may be integrated with one or more other elements of laser designator system 140, for example, or distributed as multiple logic devices within platform 110, base station 130, and/or laser designator system 140.

In some embodiments, payload controller 142 may be configured to substantially continuously monitor and/or store the status of and/or sensor data provided by one or more elements of laser designator system 140, such as the position and/or orientation of platform 110, laser designator system 140, and/or base station 130, for example, and the status of a communication link established between platform 110, laser designator system 140, and/or base station 130. Such communication links may be configured to be established and then transmit data between elements of system 100 substantially continuously throughout operation of system 100, where such data includes various types of sensor data, control parameters, and/or other data.

In various embodiments, laser designator system 140 may be configured to provide precise target geocoordinates. For example, payload controller 142 may be configured to use the various navigation sensors coupled to or within laser designator system 140, along with laser rangefinder 154, to locate targets to ±20 m of actual grid coordinates and provide precision geo-location with insensitivity to slant angle. In particular embodiments, payload controller 142 may be configured to implement a multi-state extended Kalman filter fusing LWIR imagery with other sensor data to reduce pointing and geo location error, as described herein. In various embodiments, the overlay position being displayed may represent the location of the target in the center of the display view's crosshairs. In order to maximize the position estimate precision, it is important to ensure laser designator system 140 has good sensor information, including a good range reading and vehicle heading measurement.

Range Reading: The simplest way to get a good measurement is to ensure a solid range reading by laser rangefinder 154. Heading Measurement: If UAV 110 is in motion, the controller 112 and/or payload controller 142 may be configured to generate a very good estimate of vehicle heading, such as by using GNSS 118. If UAV 110 has been stationary for an extended amount of time, or a large heading change has occurred, UAV 110 may develop a bias in heading. The best way to ensure a solid reading is to control UAV 110 to move back and forth. A simple translation ±10 m for 30 s refines the heading estimate very well. NOTE: Target location precision has no effect on laser pointing accuracy and precision. Given a properly calibrated boresight, a laser spot generated by laser target marker 152 will follow a crosshair center rendered within a display view for laser designator system 140 regardless of range estimation, target location estimation, etc.

Although system 100 is shown in FIG. 1 with a single laser designator system 140 coupled to platform 110 through gimbal system 122, in other embodiments, system 100 may include multiple laser designator systems 140, each of which may be coupled to platform 110 (e.g., though a coupler similar to gimbal system 122) and be configured to operate substantially independently from each other.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

Figure 2:
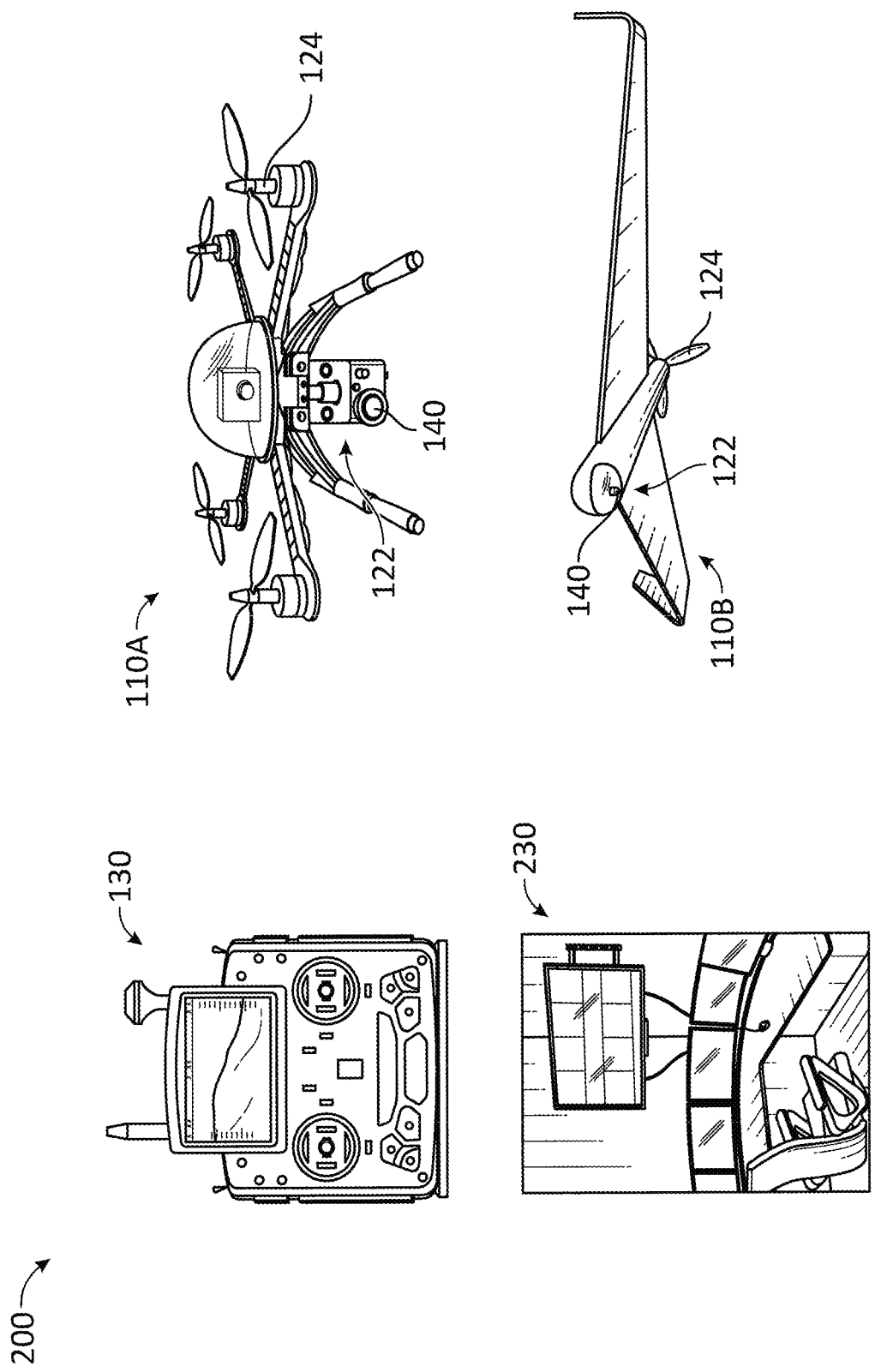
FIG. 2 illustrates a diagram of a UAS including UAVs with laser designator systems in accordance with an embodiment of the disclosure.

FIG. 2 illustrates a diagram of mobile platforms/UAVs 110A and 110B of UAS 200 including embodiments of laser designator system 140 and associated gimbal system 122 in accordance with an embodiment of the disclosure. In the embodiment shown in FIG. 2, UAS 200 includes base station 130, optional co-pilot station 230, mobile platform 110A with articulated laser designator system/sensor payload 140 and gimbal system 122, and mobile platform 110B with articulated laser designator system/sensor payload 140 and gimbal system 122, where base station 130 and/or optional co-pilot station 230 may be configured to control motion, position, orientation, and/or general operation of platform 110A, platform 110B, and/or laser designator systems 140.

In various embodiments, co-pilot station 230 may be implemented similarly relative to base station 130, such as including similar elements and/or being capable of similar functionality. In some embodiments, co-pilot station 230 may include a number of displays so as to facilitate operation of laser designator system 140 and/or various imaging and/or sensor payloads of mobile platforms 110A-B, generally separate from piloting mobile platforms 110A-B, and to facilitate substantially real time analysis, visualization, and communication of sensor data and corresponding directives, such as to first responders in contact with a co-pilot or user of system 200. For example, base station 130 and co-pilot station 230 may each be configured to render any display views described herein.

Figure 3A:
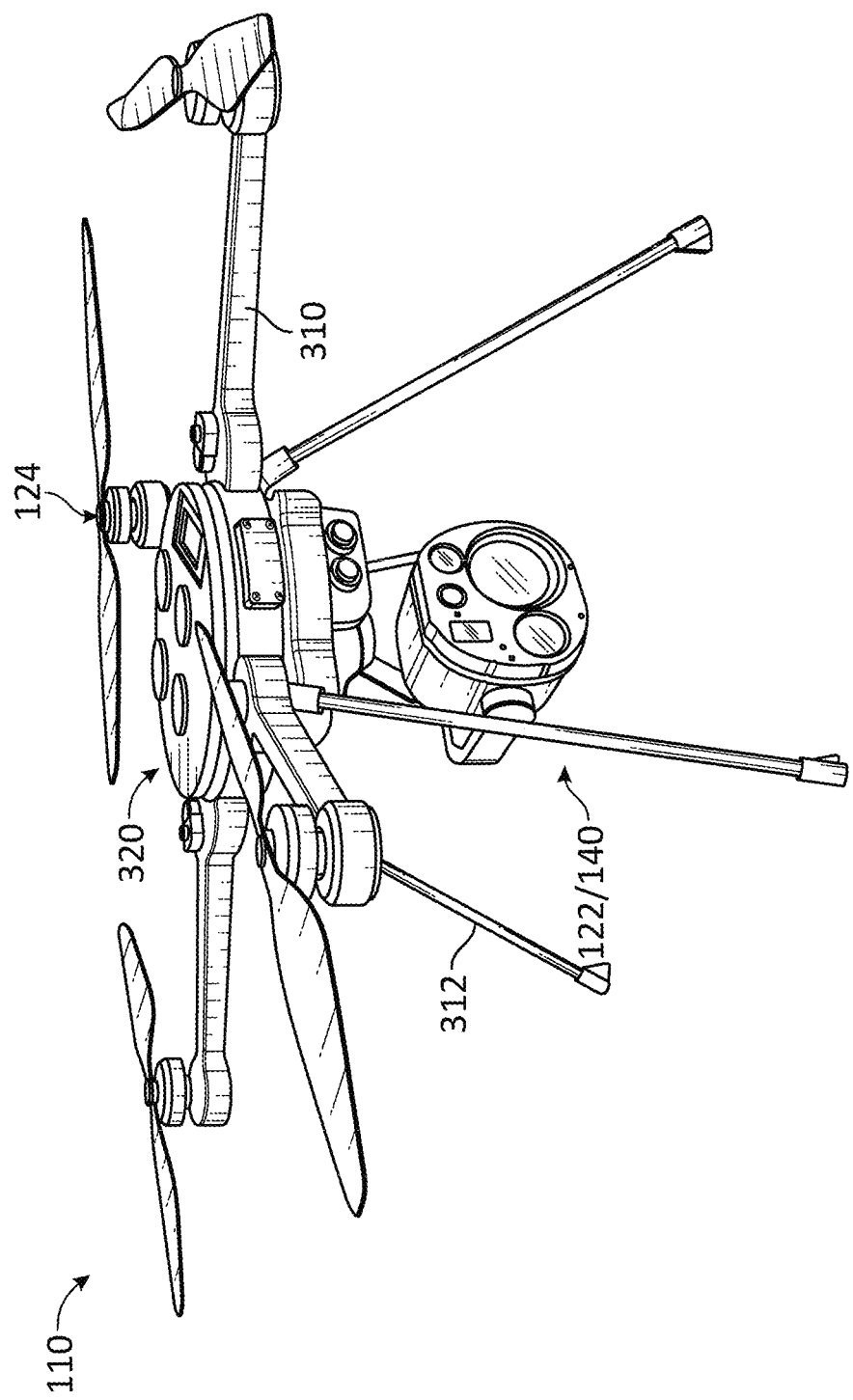
FIG. 3A illustrates a diagram of a UAV with a relatively lightweight laser designator system in accordance with an embodiment of the disclosure.

FIG. 3A illustrates a diagram of a UAV 110 with a relatively lightweight laser designator system 140 in accordance with an embodiment of the disclosure. In particular, UAV 110 in FIG. 3A includes airframe 310 supporting propulsion system 124 and navigation sensor cluster 320 (e.g., including various elements of system 100, including orientation, position, and/or motion sensors, for example, and/or visible spectrum and/or NIR/thermal imaging modules configured to assist in navigation of UAV 110. UAV may include landing legs 312, which may be fixed and/or releasably coupled to airframe 310, and sensor platform 140 may be coupled to airframe 310 of UAV 110 via gimbal system 122, as described herein.

Figure 3B:
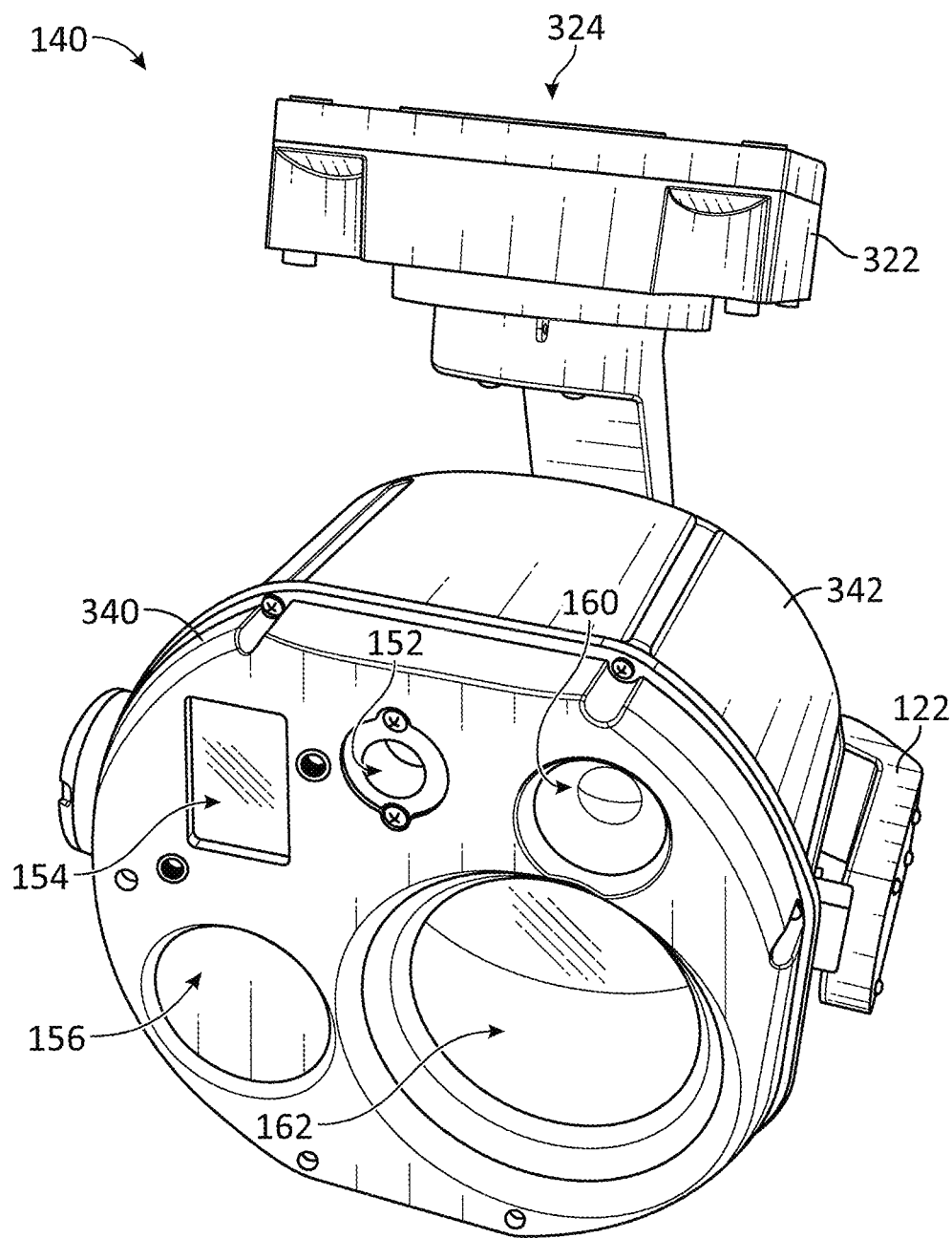
FIG. 3B illustrates a diagram of a relatively lightweight laser designator system in accordance with an embodiment of the disclosure.

FIG. 3B illustrates a diagram of a relatively lightweight laser designator system 140 in accordance with an embodiment of the disclosure. In particular, laser designator system 140 in FIG. 3B includes laser target marker 152, laser rangefinder 154, laser spot tracker 156, WFOV IR imaging module 160, and NFOV IR imaging module 162 each mounted to optical datum faceplate 340. Laser designator system 140 may include back or body housing 342 sealing the various elements of laser designator system 140 from environmental conditions and linking optical datum faceplate 340 and gimbal system 122. Gimbal system 122 may include airframe mounting plate 322 and platform interface 324 configured to provide power (e.g., sourced form UAV 110) to and/or telemetry communications with gimbal system 122 and/or laser designator system 140.

Figure 4A:
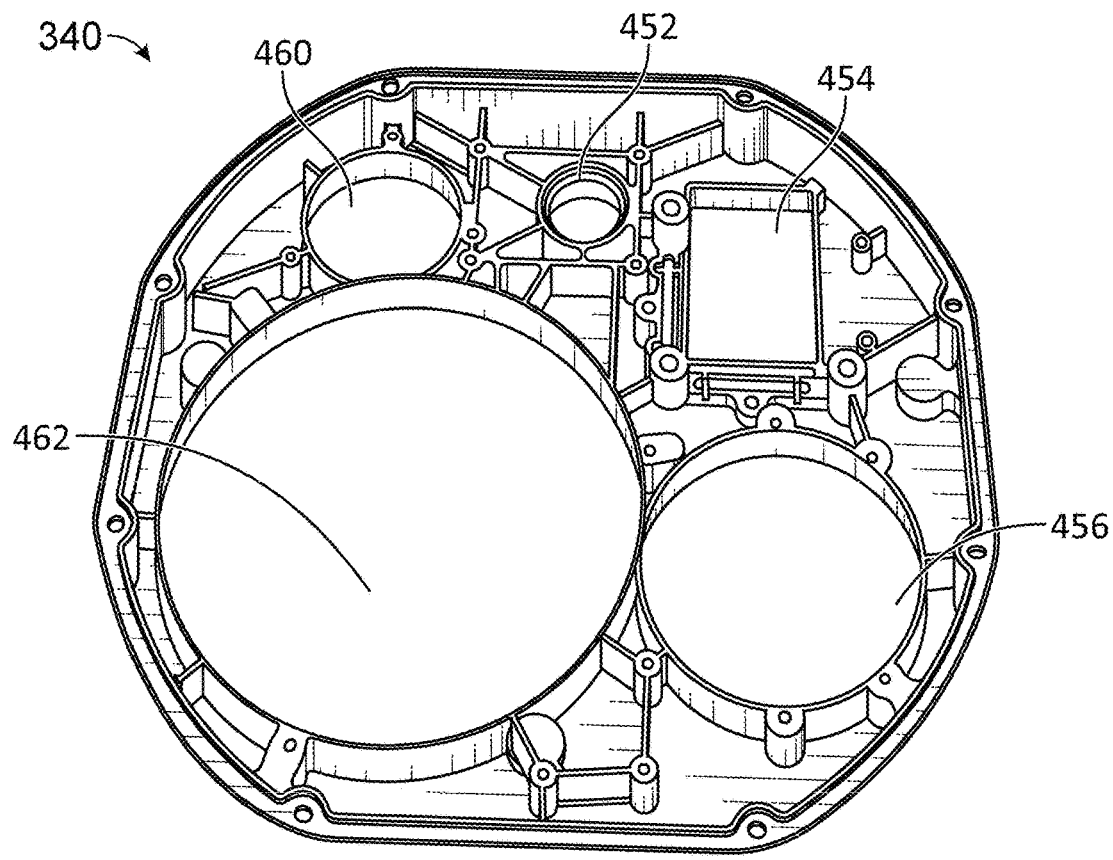
FIGS. 4A-4C illustrate diagrams of an optical datum for a relatively lightweight laser designator system in accordance with embodiments of the disclosure.
Figure 4B:
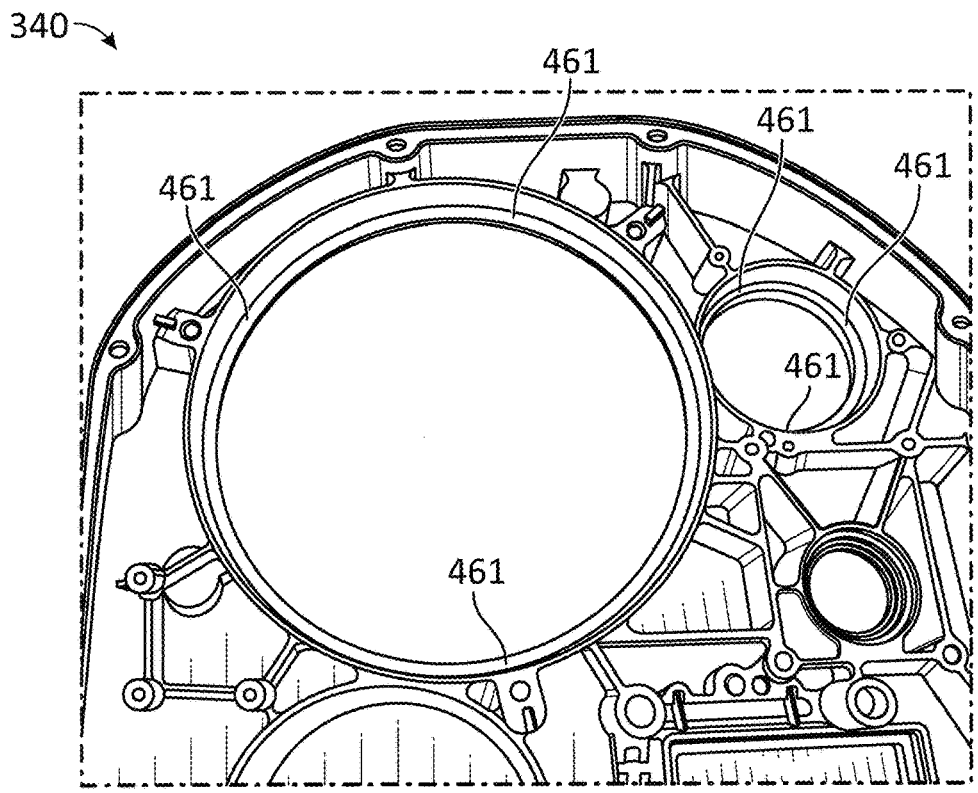
Figure 4C:
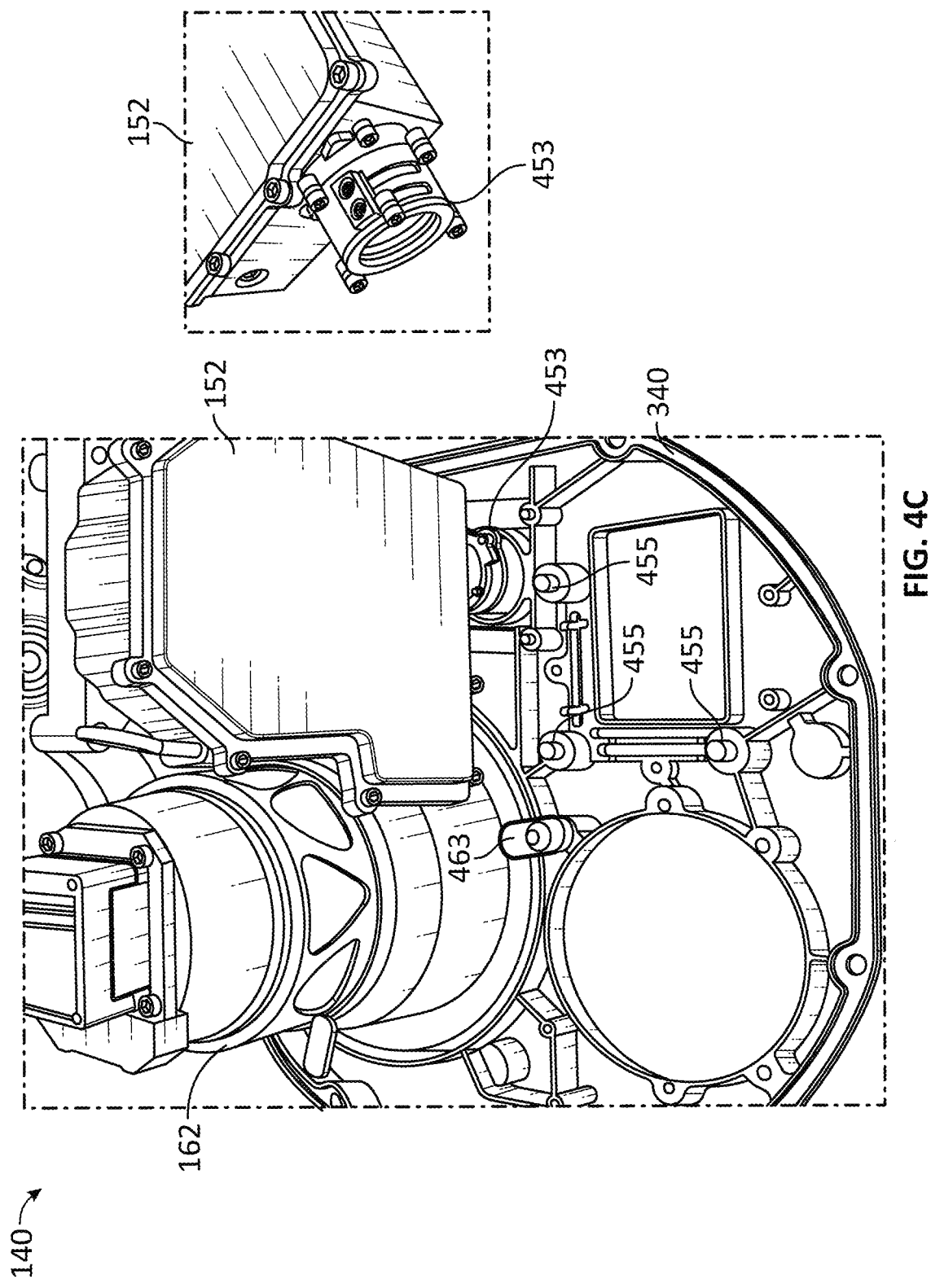

FIGS. 4A-4C illustrate diagrams of optical datum faceplate 340 for relatively lightweight laser designator system 140 in accordance with embodiments of the disclosure, where optical datum faceplate 340 is configured to provide shock, vibration, and athermal boresight retention for all optical elements of laser designator system 140 in order to achieve relatively high system pointing error performance while reducing the overall weight of laser designator system 140. For example, FIG. 4A shows optical datum faceplate 340 with various optical mount ports, such as laser target marker mount port 452, laser rangefinder mount port 454, laser spot tracker mount port 456, WFOV IR imaging module mount port 460, and NFOV IR imaging module mount port 462, each configured to optically align each optical element to each other and/or to the boresight of laser designator system 140.

For example, as shown in FIG. 4B, each mount port may include three or more raised surface mounting points 461 positioned 120 degrees apart from each other and configured to provide pseudo-kinematic contact points for optical device mounting within the various mount ports as shown. When a rear clamping pressure is applied to ensure contact between the optical element (e.g., a lens of the optical element) and the pseudo-kinematic contact points, such as by surface clamps 463 providing rear clamping pressure to a lens of NFOV IR imaging module 162 shown in FIG. 4C, the minimized surface contact provides near perfectly constrained mounting in 4 degrees of freedom (DOF), which fully constrains the angular motion of each optical element. The remaining 2 DOF are under-constrained in translation, but this X-Y motion is orthogonal to the angular alignment retention and so does not affect boresight alignment error and furthermore allows for an o-ring to maintain integrity while helping to seal an interior of laser designator system 140 from water ingress and/or other environmental contamination.

More generally, optical datum faceplate 340 may be machined from a single piece of bulk metal for precision (e.g., +−1-2 thousands of an inch, or better, over the width of optical datum faceplate 340 and particularly with respect to the relative positioning and planing of the various mount ports of optical datum faceplate 340) and include a variety of plunge cuts and interlocking webbing configured to reduce overall weight without significantly reducing stiffness and to damp or eliminate vibrational modes in optical datum faceplate 340 that overlap with typical environmental and motional vibrations experienced while in flight via a class 1 UAV. As such, optical datum faceplate 340 may be configured to facilitate the use of a combination of opto-mechanic and kinematic techniques to ensure the optical elements stay properly aligned over the shock, vibrational, and thermal envelope of UAS 100.

In particular, optical datum faceplate 340 may be shaped to ensure the natural frequency of each sub & super structure had first modes a minimum of 2× the highest expected external force frequency while minimizing mass to stay within a system mass budget appropriate to relatively lightweight UAVs, and while ensuring relatively high boresight retention performance throughout the expected operational vibration environments. Such construction may reduce or eliminate detectable relative angular motion between the optical elements that conventionally arises from a multi part construction (e.g., due to CTE mismatch, over-constrained mounting, stress buildup, mounting slip, etc.)

In some embodiments, such as that shown in FIG. 4C, a mount port of optical datum faceplate 340 may be configured to receive a Risley Prism Pair 453 (e.g., housed in a cylindrical mount) coupled to an optical element, where prism pair 453 is configured to provide for opto-mechanical beam steering in azimuth and elevation during initial factory alignment of the optical element and then may be mechanically fixed (e.g., to optical datum faceplate 340 and the optical element, or between these) to form the final optical output of the optical element and to fully constrain relative rotation about the beam axis to prevent unwanted beam steering. For example, in some embodiments, such prism pair may be coupled to and/or between laser target marker 152 and optical datum faceplate 340, as shown. Such optical layout is insensitive to optical shift, tilt, or translation.

Figure 4D:
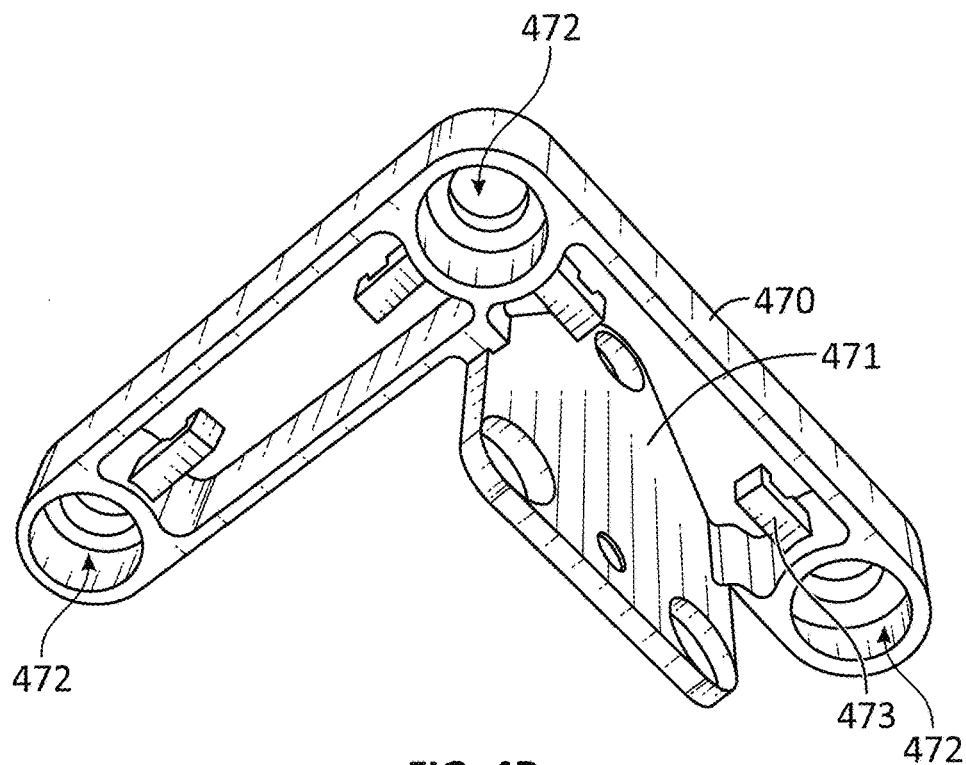
FIGS. 4D-4F illustrate diagrams of a kinematic mount assembly for an optical datum of a relatively lightweight laser designator system in accordance with embodiments of the disclosure.
Figure 4E:
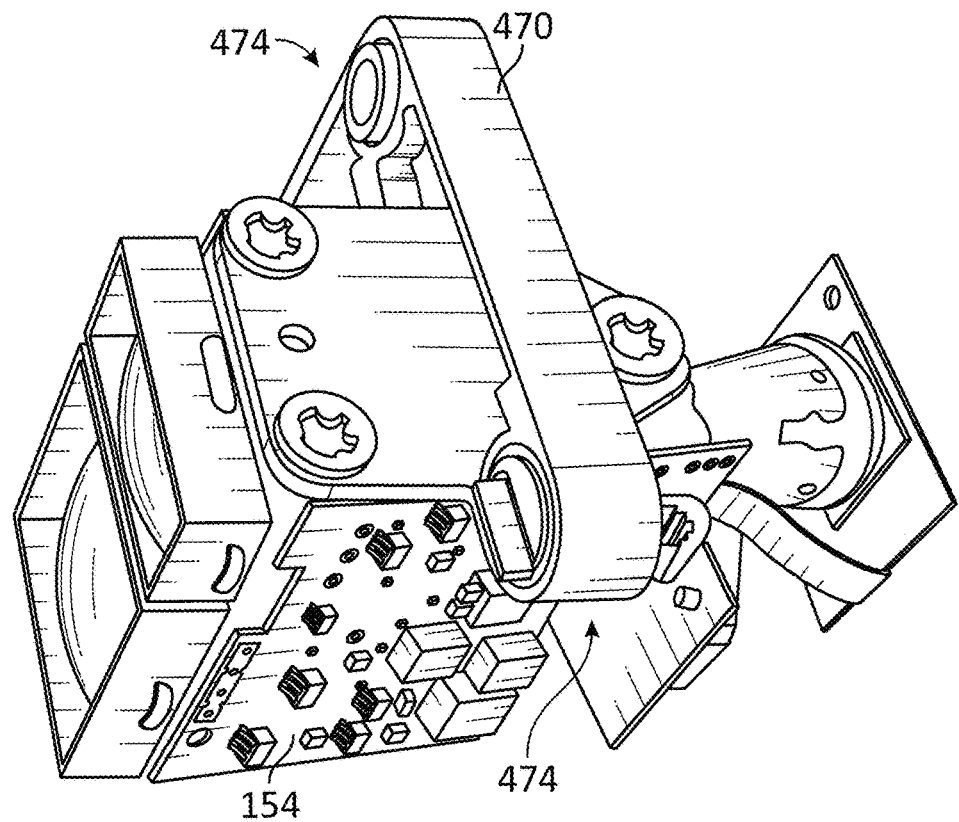
Figure 4F:
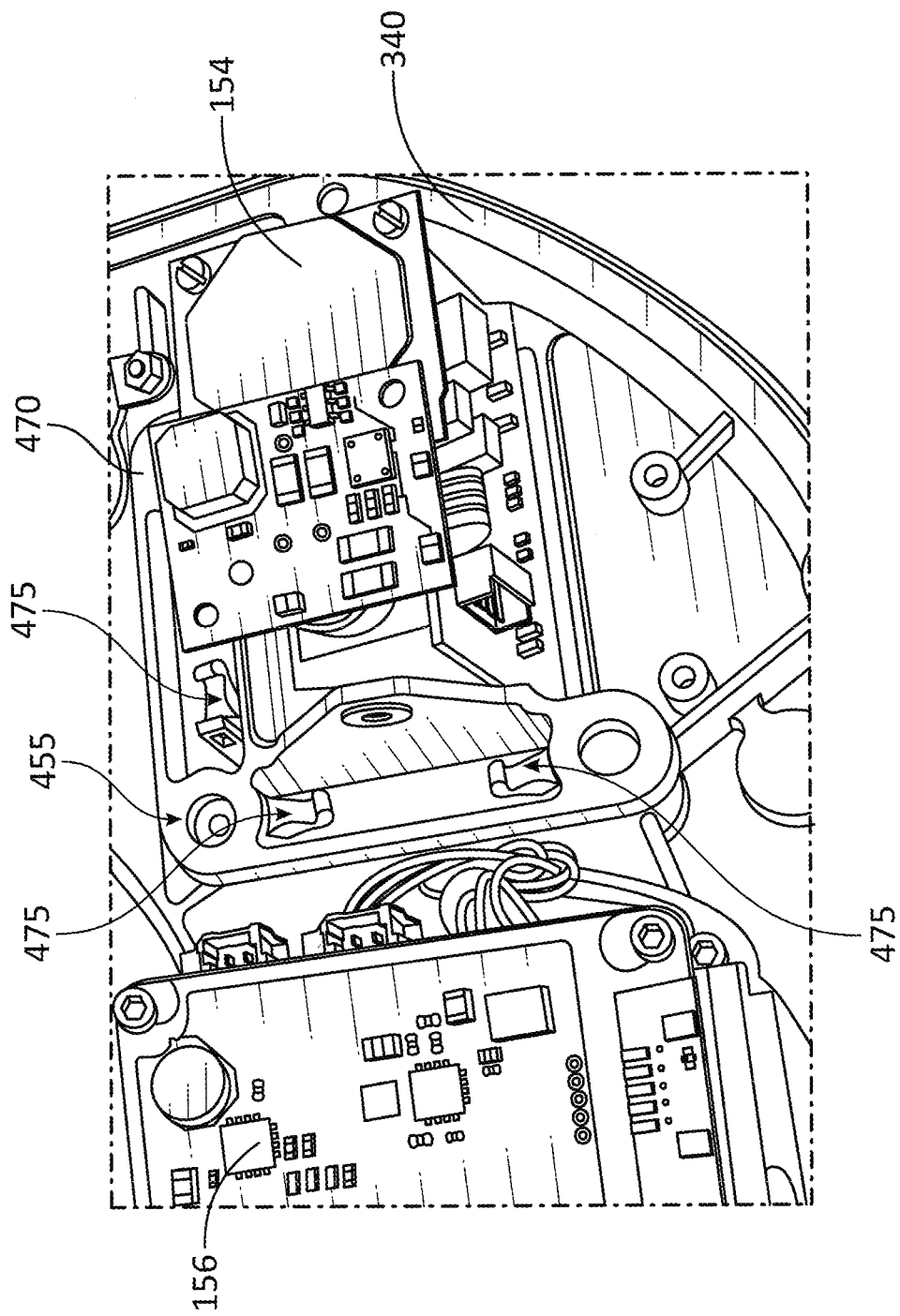

In other embodiments, a mount port of optical datum faceplate 340 may include a true kinematic mounting scheme implemented by a kinematic mount assembly and associated adjustable screws embedded into a mount port of optical datum faceplate 340. For example, FIGS. 4D-4F illustrate diagrams of a kinematic mount assembly 470 for optical datum faceplate 340 of relatively lightweight laser designator system 140 in accordance with embodiments of the disclosure, and FIG. 4C shows adjustable screws 455 embedded into mount port 454 of optical datum faceplate 340 for laser rangefinder 154. In FIG. 4D, kinematic mount assembly 470 is implemented as a metal assembly including a mounting bracket 472 to couple kinematic mount assembly 470 to laser rangefinder 154 and three cups 472 configured to receive three steel kinematic inserts 474 with ball point contacts arranged in a 1-2-3 kinematic layout configured to constrain the optical element in 6 DOF when in contact with adjustment screws 455 (e.g., in FIG. 4C).

In some embodiments, two of the ball point contacts are in contact with micro-pitch adjustment screws 455 thereby allowing for azimuth and pitch angular adjustments. In addition, kinematic mount assembly 470 may include a plurality of spring preload tabs 473 configured to engage with tension springs 475 embedded within mount port 454 of optical datum faceplate 340 for laser rangefinder 154. In particular, laser rangefinder 154 may be relatively sensitive to mechanical shocks, and the preload force generated by spring preload tabs 473 and tension springs 475 may be configured to provide flexibility during high shock events (shipping, hard landings, etc.) to prevent plastic deformation or part failure, yet return laser rangefinder 154 to its nominal position during normal operation. More generally, various optical elements of laser designator system 140 may be configured to use 3-point pseudo kinematic mounting patterns with alignment pins to provide full 6 DOF mounting to optical datum faceplate 340.

Figure 5A:
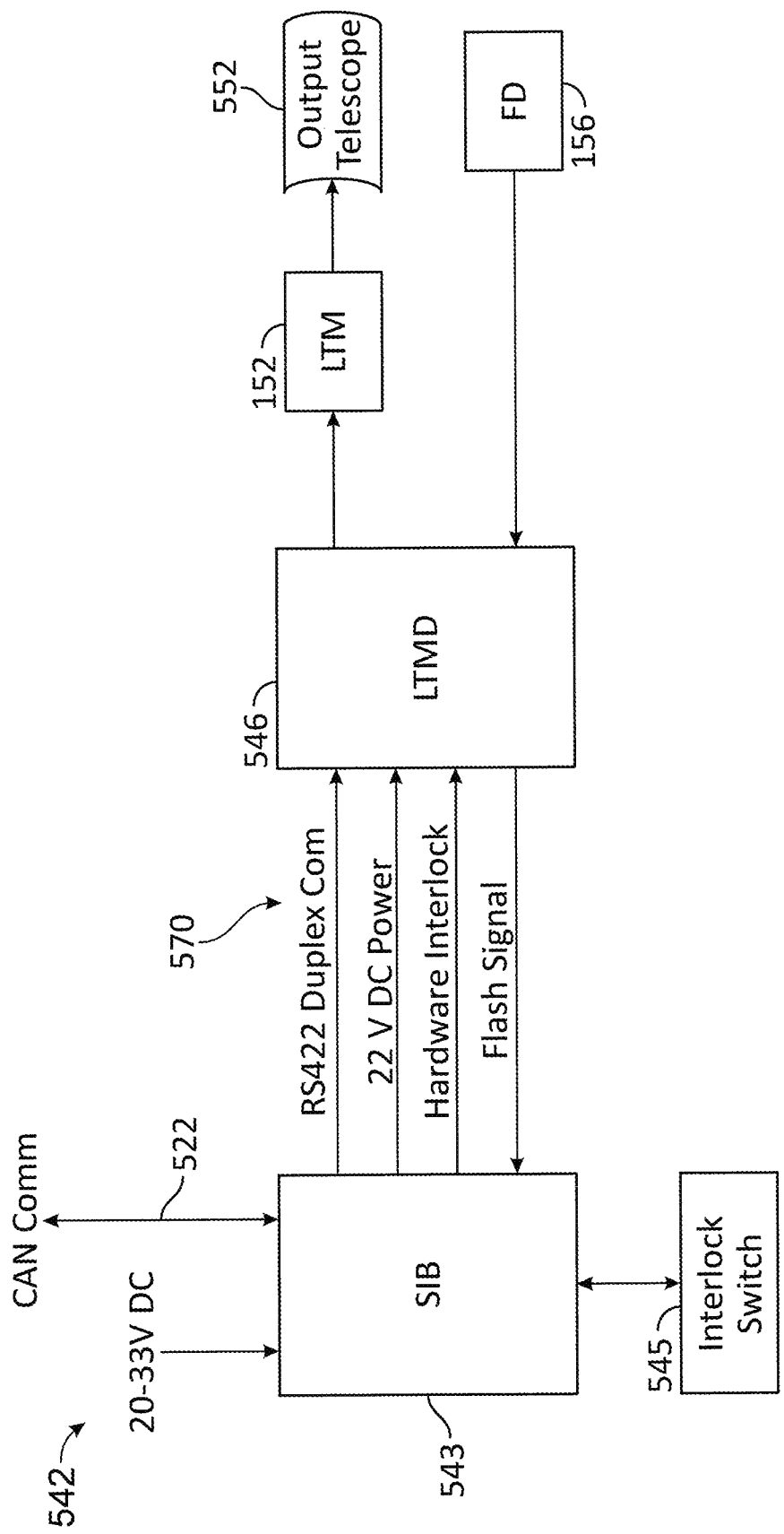
FIGS. 5A-5C illustrate block diagrams of a distributed payload controller for a laser designator system in accordance with an embodiment of the disclosure.
Figure 5B:
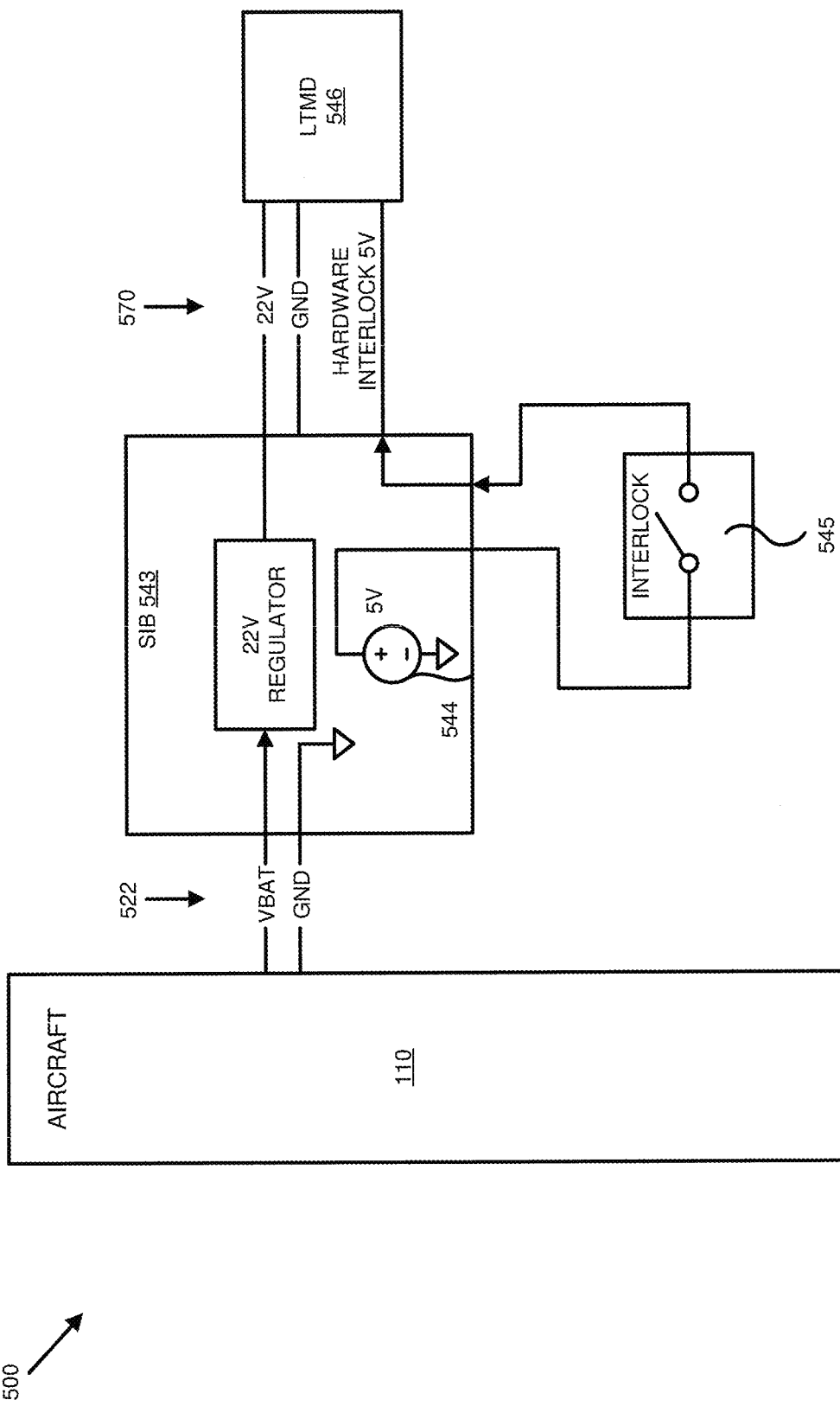
Figure 5C:
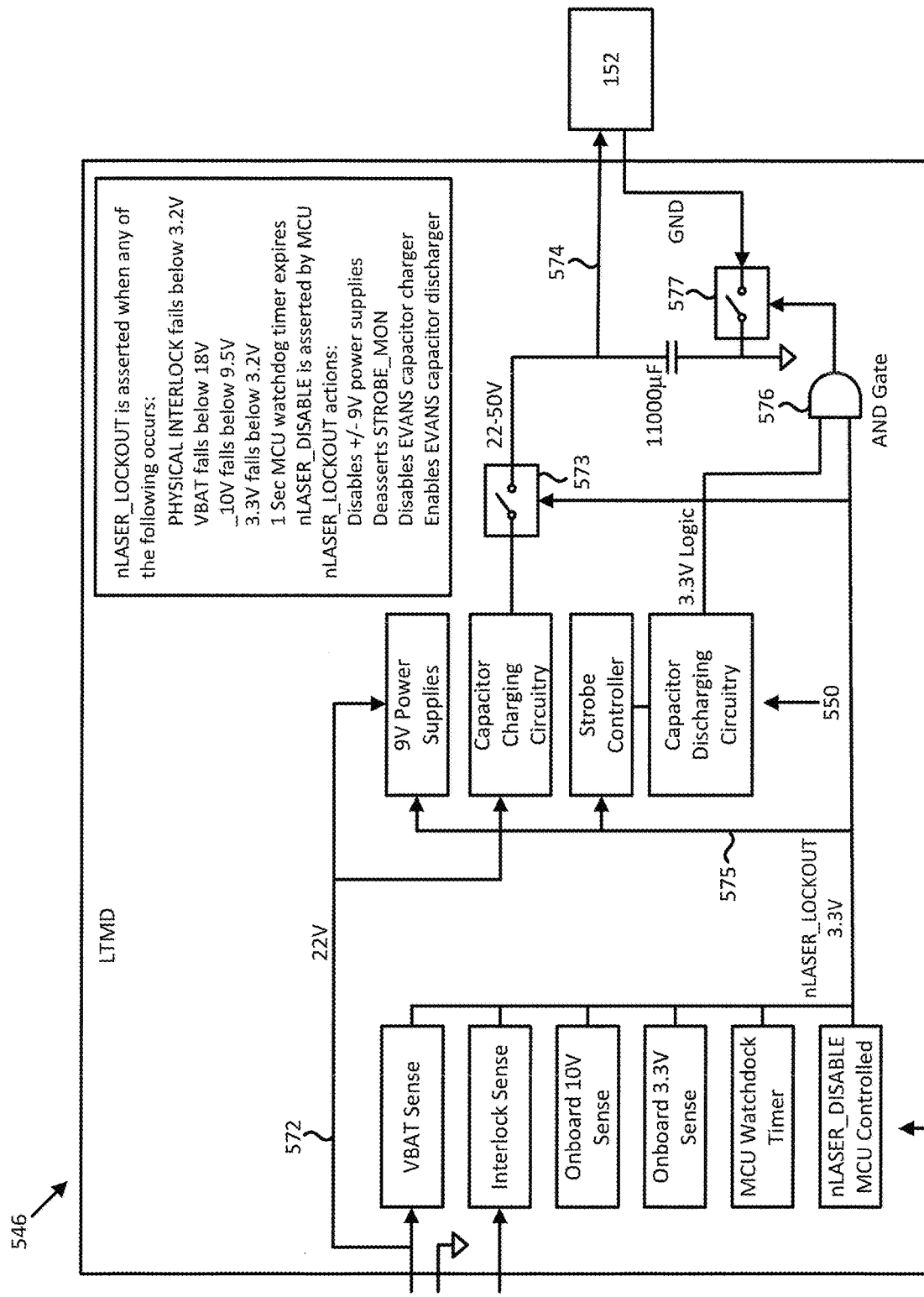

FIGS. 5A-5C illustrate block diagrams of a distributed payload controller 542 for laser designator system 140 in accordance with an embodiment of the disclosure. In general, any of the various elements of distributed payload controller 542 may be implemented similarly to controller 112 and/or payload controller 142 of UAS 100.

In some embodiments, payload controller 542 may be configured to assist in safe operation of laser designator system 140. For example, payload controller 542 may be configured to block firing of laser target marker 152 under various circumstances where there is risk to an operator or other person in view of laser designator system 140. In one embodiment, payload controller 542 may be configured to detect laser target marker 152 is aimed such that a laser beam generated by that laser target marker 152 would enter a no-fire zone (e.g., including a remote operator and/or 3rd parties outside of a target zone) and block firing of laser target marker 152 until it is aimed outside the no-fire zone. In another embodiment, payload controller 542 may be configured to implement dead-man and watchdog timers and disable interlocks to address loss of communication between base station 130 and UAV 110 and/or sensor payload 140, for example, which limits exposure of non-targeted areas in the case of loss of wireless communications preventing direct control by an operator. Payload controller 542 may be configured to prevent laser operation during transit, launch, pre-launch, landing/landing phases, and/or other flight states and/or failsafe modes.

In FIG. 5A, payload controller 542 includes sensor interface module 543 configured to provide a power and/or data interface between elements of laser designator system 140 and UAV 110. For example, sensor interface module 543 may be configured to receive power from UAV 110 and communicate data with UAV 110 over UAV interface 522 (e.g., including a power bus and a data bus). In some embodiments, sensor interface module 543 may be configured to control operation of gimbal system 122, mediate PRF code select and laser FIRE commands, and/or regulate laser power, for example, and may include various laser safety interlock interfaces and hardware, as described herein.

In some embodiments, sensor interface module 543 may be configured to provide power and communicate data with other elements of payload controller 542 via payload interface 570 (e.g., including a power bus, an interlock signal bus, a flash signal bus, and a data bus, as shown). Such other elements may include laser driver 546, which may be configured to implement various safety interlocks, as described herein. For example, sensor interface module 543 may be coupled to a mechanical interlock switch 545 that must be manually enabled before laser target marker 152 is allowed to fire. Laser driver 546 may be configured to disable laser target marker 152 until laser driver 546 receives a hardware interlock disengaged signal over an interlock signal bus of platform interface 570. Also shown in FIG. 5A are laser target marker optics 552 and flash detector 156, which may be implemented similar to laser spot tracker 156.

In FIG. 5B, UAS 500 (implemented similar to UAS 100 of FIG. 1) includes UAV 110 in communication with sensor interface module 543 over UAV bus 542, system interface module 543 including a power regulator and, separately, an interlock signal generator 544 coupled through mechanical interlock 546 to laser driver 546, both over platform interface 570. In general laser driver 546 may be configured to provide pump pulse waveforms to diodes associated with laser target marker 152 (e.g., upon command from system interface module 543), to monitor laser beam presence via flash detector 156, and otherwise monitor overall system health associated with laser target marker 152. In some embodiments, laser driver 546 may be configured to implement additional safety hardware interlocks protecting operation of laser target marker 152, as described herein. Flash detector 156 may be configured to monitor light output by laser target marker 152, such as 1064 nm laser light.

In FIG. 5C, laser driver 546 includes power bus 572 (e.g., coupled to platform interface 570) providing power to laser safety interlock elements 548 and laser driver elements 550. Laser safety interlock elements 548 may be configured to implement various safety interlock logic, as shown, and provide a safety enable/disable signal to laser driver elements 550, electrical interlock 573, and AND gate 576. Laser driver elements 550 may be configured to selectively power laser target marker 152 over laser power bus 574 and, in some embodiments, provide a separate safety discharge signal to AND gate 576 to control safe operation of laser target marker 152 in the context of power delivery. AND gate 576 may be configured to provide a safety operation signal to electrical interlock 577 configured to isolate laser target marker 152 from an electrical ground.

Figure 5D:
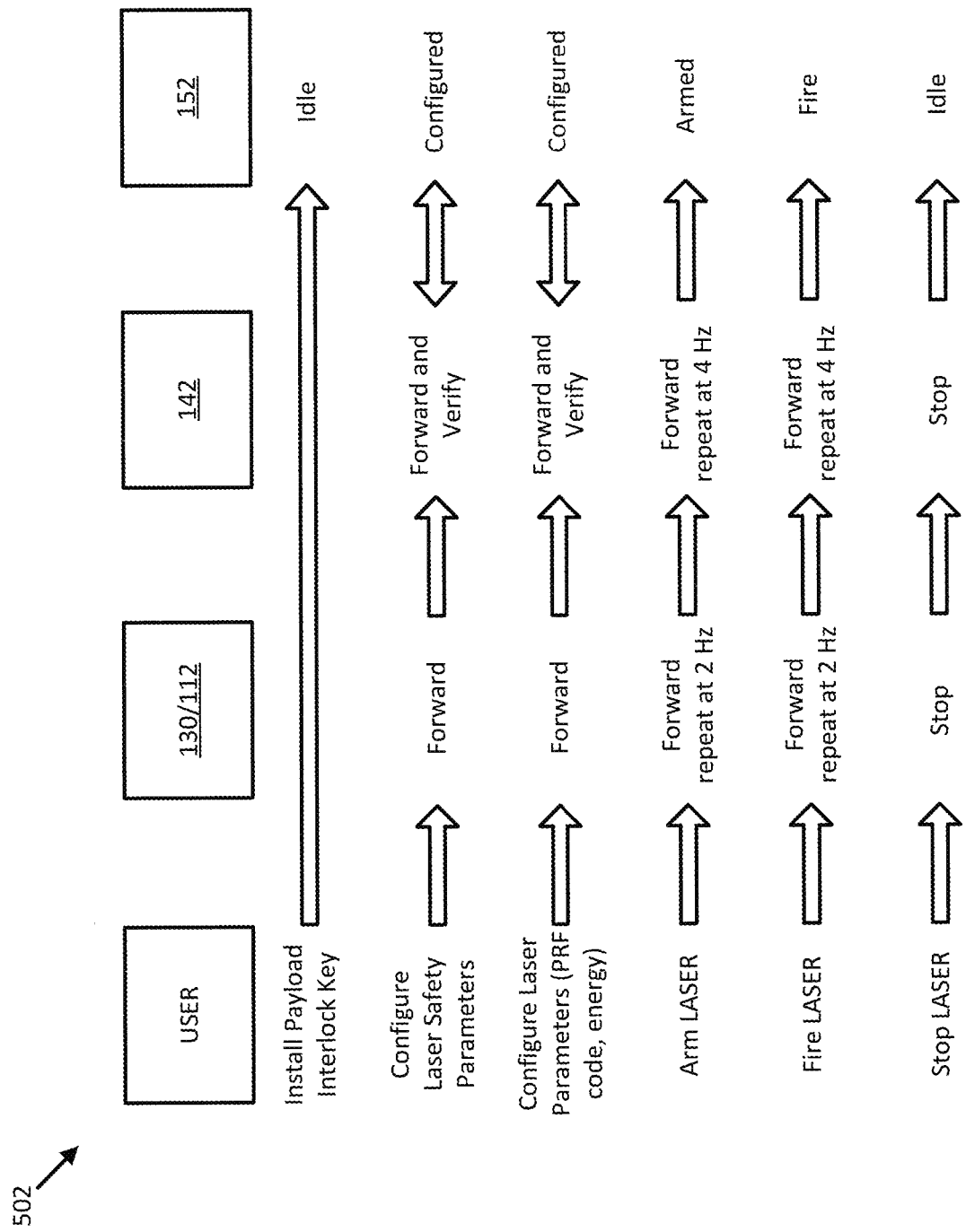
FIG. 5D illustrates a flow chart of safety interlocks implemented by a payload controller for a laser designator system in accordance with an embodiment of the disclosure.

FIG. 5D illustrates a flow chart 502 of software and mechanical safety interlocks implemented by payload controller 142 and/or 542 for laser designator system 140 in accordance with an embodiment of the disclosure. For example, flow chart 502 may illustrate the increasing requirements necessary to fire laser target marker 152 and from the various elements of UAS 100, including a user, base station 130 and/or controller 112, payload controller 142, and laser target marker 152. Generally, laser designator system 140 may be configured such that safety parameters for laser target marker 152 must be provided before laser target marker 152 will arm (and such safety parameters may be continuously monitored during laser firing). In some embodiments, laser target marker 152 and/or payload controller 142 may be configured to require a heartbeat signal to be received (e.g., from UAV 110 and/or base station 130) every 2-4 Hz for laser target marker 152 to fire or remain firing and/or armed. In such embodiments, any loss of such heartbeat signal disables laser target marker 152 immediately.

For example, in one embodiment, sensor interface module 543 may be configured to execute a software-based communications watchdog timer to monitor communications between sensor interface module 543 and laser driver 546, which is configured to control firing of laser target marker 152. Sensor interface module 543 may be configured to control laser driver 546 to stop firing laser target marker 152 if no communications (e.g., no heartbeat command signal) are received by sensor interface module 543 within a specified time (e.g., 0.5 seconds), repeatedly. Alternatively, or in addition, laser driver 546 may be configured to execute such watchdog timer, monitor such communications, and stop firing of laser target marker 152 if no communications are received by laser driver 546 within the specified time. Such operation may occur within 100 ms of the watchdog timer being exceeded/allowed to expire. In a related embodiment, a separate user input watchdog timer (e.g., executed by base station 130) may terminate firing of laser target marker 152 if 20 seconds elapse without active user input being received by user interface 132. Such user input watchdog timer may be active and operative to stop firing of laser target marker 152 regardless of all other laser safety settings associated with operation of laser designator system 140.

In the top row of flow chart 1, a user installs a payload interlock key before any of the elements may communicate with laser target marker 152. In the second row of flow chart 502, safety parameters must be propagated through the various elements to laser target marker 152 before moving to the third row, which similarly blocks arming or firing of laser target marker 152 until after both safety and laser parameters are provided to laser target marker 152. In addition, however, a relatively low frequency heartbeat signal must be provided by base station 130 and/or controller 112 to payload controller 142, and a relatively high frequency (e.g., double the prior frequency) heartbeat signal must be provided by payload controller 142 to laser target marker 152 in order to maintain an armed status for laser target marker 152. In the fifth row, the same heartbeat signals must be generated and received to maintain firing of laser target marker 152. In the 6th row, a stop command from the user propagates through UAS 100 and places laser target marker 152 in idle mode.

More generally, user interface 130, controller 112, payload controller 142, and/or other elements of laser designator system 140 and/or UAS 100 may be configured to implement various safety interlocks and/or other features to eliminate risk of causing harm with laser target marker 152. In particular, UAS 100 may be configured to implement multilayer hardware and software safety measures selected to meet or exceed DOD and general laser safety standards.

For example, payload controller 142 may be configured to monitor an orientation of gimble system 122 and disable laser target marker 152 when gimble system 122 points out of predetermined range of orientations, for example, or out of a predetermined pointing window in which viable targets are disposed. Various elements of UAS 100 may implement watchdog timers, dead-man countdown timers, and/or other loss of communication failsafes, as described herein. Various elements of UAS 100 may also be configured to disable laser target marker 152 unless UAV 110 is airborne. UAS 100 and/or laser designator system 140 may include one or more other more physical or tangible safety features, including a laser aperture cover, toggleable interlocks, and/or visual indicators (e.g., for an armed, firing, and/or idle state of laser target marker 152) that may be rendered as part of display view associated with operation of UAS 100.

In some embodiments, laser designator system 140 may be equipped with a physical laser interlock switch (e.g., interlock switch 545), an aperture cover (e.g., to fit in an external recess in optical datum faceplate 340 opposite mount port 452, and removable power (e.g., as controlled by laser driver 546), as disclosed herein. When used properly, such physical safeties can prevent user exposure to laser radiation when installing/removing and storing payload 140. In various embodiments, laser interlock switch 545 may be located on a rear side of payload 140, such as in a wall of body housing 342. Laser interlock switch 545 may be able to physically disable power and control circuits associated with operation of laser target marker 152, including power supplies, diode driver capacitor chargers and dischargers, laser driver pump pulse controls, and/or dedicated switched laser power separate from main processor power. In general, laser interlock switch 545 should be set to "disarm" whenever a user does not expect to use laser target marker 152. Decoupling gimble system 122 from UAV 110 and/or laser designator system 140 from gimble system 122 should operate similar to laser interlock switch 545

In related embodiments, laser designator system 140 may be equipped with and/or configured to implement hardware watchdogs configured to monitor laser system voltage, such that hardware watchdogs disable many of the same functions as embodiments of laser interlock switch 545. In one embodiment, such hardware watchdog may be configured to monitor V batt, 10 V, and 3.3 V regulators of laser designator system 140 (e.g., typically integrated with laser driver 546). For example, such hardware watchdog may be configured to disable laser target marker 152 and/or laser driver 546 before a supply voltage laser target marker 152 and/or laser driver 546 drops below functional levels.

Laser designator system 140 may also be equipped with a laser aperture cover (e.g., other modules 158) configured to fit into an external recess formed in optical datum faceplate 340 opposite mount port 452, for example, and block laser light generated via any accidental firing of laser target marker 152. Such laser aperture cover may be positively retained in the external recess and be light tight for all laser energy in excess of ANSI AEL for class 1 laser radiation. Such laser aperture cover may be shaped to only install within the external recess according to one orientation, thereby ensuring positive identification of correct installation and beam blocking. The laser aperture cover may be formed from a relatively high heat rating material designed and tested to block continuous laser firing without degradation. In some embodiments, such laser aperture cover may not be permanently attached to the payload; a user may remove and stow the laser aperture cover similar to a camera lens cap. In related embodiments, gimbal system 122 may not be articulatable while the laser aperture cover is attached to gimbal in an "open" position.

More generally, such laser aperture cover or plug may be configured to prevent dangerous laser radiation exposure; it may absorb the laser energy and converts it into heat. The laser aperture cover should remain in position until payload 140 is readied for flight, powered, and stabilizing. Users should remove the laser aperture cover by standing behind the system away from the laser beam direction. The laser aperture cover may be stored in a clean location to prevent debris from collecting on the inner face. It is good practice to remove the laser aperture cover before arming the laser interlock switch and to disarm the switch before re-installing the laser cover. Laser designator system 140 may include one or more cover detectors configured to monitor whether the laser aperture cover is installed or not, for example, and report such status to a user, in addition to disabling laser target marker 152 based on such status.

In various embodiments, laser designator system 140 may not include any of its own battery storage, out of an abundance of caution regarding safe operation of laser designator system 140. Capacitors in the laser circuitry may be designed to self-discharge and do so 5-10 s after laser target marker 152 stops firing. When laser designator system 140 is removed from UAV 110, it can be considered to be in a safe state.

In supplemental embodiments, payload controller 142 may be configured to determine geofencing restrictions associated with operation of laser target marker 152 each time laser target marker 152 is armed and/or fired. For example, in some embodiments, payload controller 142 may be configured to disable laser target marker 152 if UAV 110 exits a predetermined 3D airspace or a laser spot or termination generated by laser target marker 152 exits a 2D area about a designated target. Such operational geofencing status may be determined each time laser target marker 152 is fired and/or according to a countdown timer or periodic check while laser target marker 152 is fired. In related embodiments, payload controller 142 may be configured to disable laser target marker 152 if UAV 110 enters a 3D airspace disposed about a home or takeoff position, for example, or if laser target marker 152 is aimed through or towards a 2D area disposed about the home or takeoff position. In further related embodiments, payload controller 142 may be configured to disable laser target marker 152 if an elevation angle of gimble system 122 and/or laser designator system 140 exceeds a preselected maximum elevation angle (e.g., where laser designator system 140 is aimed above the local horizon). In various embodiments, such geofences may be defined as cubes or parallelepipeds as opposed to spheres/cylinders to reduce utilization of available computation resources.

FIGS. 6A-6D illustrate display views associated with operation of laser designator system 140 in accordance with embodiments of the disclosure. In FIGS. 6A-6D, each display view illustrates how user operation of laser designator system 140 may be integrated into primary UAS control software to provide a single point of control for each of the elements of UAS 100.

Figure 6A:
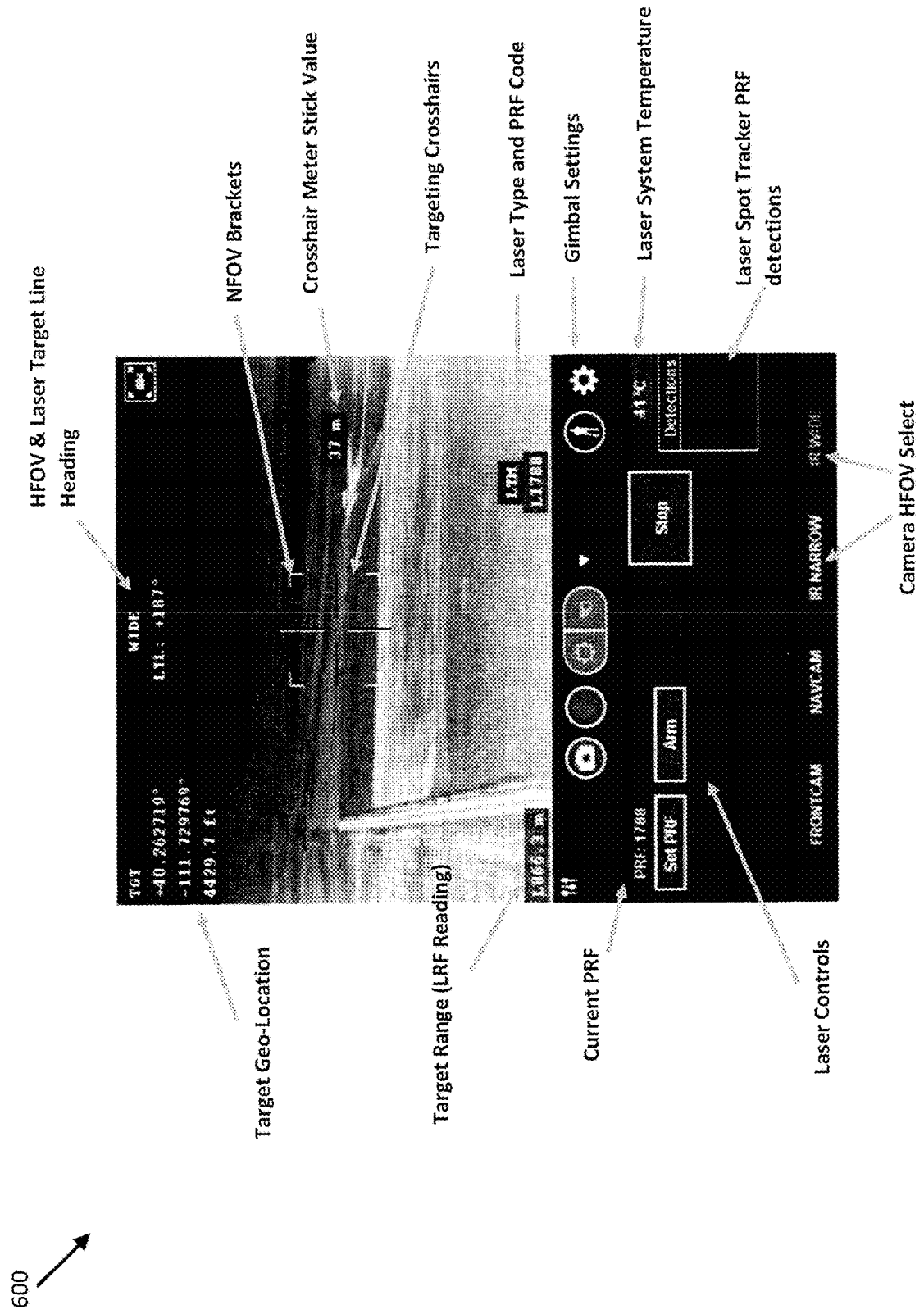

For example, display view 600 of FIG. 6A illustrates a typical operational display view for laser designator system 140. As shown in FIG. 6A, display view 600 may include a variety of menu items, buttons, selectors, graphical indicators, image data, sensor data, and/or other display view elements. A description of the various display view elements identified in display view 600 includes the following.

Target Geo-Location: Lists the latitude, longitude, and elevation of the position marked by the crosshair center. When laser rangefinder data is available, this reading is exceptionally precise. Laser Range: This the slant distance from the vehicle to target. When laser rangefinder 154 has a good return, the overlay will include an "L" before the range number. If the distance to target is beyond a capability of laser rangefinder 154 or the finder does not get a confident return, laser designator system 140 will resort to an inertial range estimate; the position overlay will be preceded by and "I" indicating an inertial slant range estimate is being presented. Laser Controls: These controls operate the laser marker or designator.

Camera FOV Select: These buttons allow the user to switch between NFOV IR imaging module 162 and WFOV IR imaging module 160 on sensor payload 140. The current selection highlights blue. All payload functionality and information displayed is the same between each camera. NOTE: any digital zoom settings are camera dependent; the digital zoom settings do not carry from field of view to field of view. Laser Spot Tracker PRF Detections: This dialog box lists the PRF codes detected by laser spot tracker 156. In some embodiments, up to 4 codes can be simultaneously tracked. When laser spot tracker 156 detects a laser reflection that emanated from laser designator system 140, the PRF will be listed and highlighted in RED. This indicates good pulse frequency is being reflected off of the target.

Laser System Temperature: This bar lists the current temperature of laser target marker 152. The sliding colored bar indicates how far away from maximum temperature laser target marker 152 is. Blue color indicates good operational temperature and the user should not be concerned about engaging laser target marker 152. Yellow color indicates laser target marker 152 is approaching a maximum operational temperature and that a self-shutdown event may occur; the user should evaluate the length of time a laser operation is required before firing laser target marker 152. A red color indicates the system has reached is maximum temperature and that shutdown is imminent and/or may have already occurred. Payload Settings: This menu gives the user access to many configuration options for the payload operation, what information is presented, and how the overlays behave.

Laser Type and PRF Code: This overlay informs the user whether an Laser Target Marker (shown as "LTM") variant is being used, or a Laser Target Designator (shown as "LTD") is being used. Additionally, the current laser PRF code is displayed. Targeting Crosshairs: These crosshairs indicate the location or object about which system information is being generated such as target range and location. Additionally, the crosshairs indicate where the laser beam will terminate when the system fires. Crosshair Meter Stick Value: This value indicates the length of the right horizontal crosshair as overlaid on the image. This can be used to estimate the sizes of target and objects of interest in the camera field of view. When a laser rangefinder distance is available, the calibration of the length of this line is exceptionally precise. NOTE: Sans laser rangefinder data, inertial range estimates may present erroneous data when observing objects many meters above the ground such as the side of a building.

NFOV Brackets: When using WFOV IR imaging module 160, these brackets indicate the field of view captured by NFOV IR imaging module 162. When switching between the two optics, the user can use these brackets to know what objects will remain in their field of view before switching to a narrow optic. HFOV & Laser Target Line Heading: This overlay indicates which field of view is currently displayed. The heading value indicates the heading from payload 140 (UAV location) to the target observed in the crosshairs.

In some embodiments, a user may use display view 600 to fire laser target marker 152. For example, UAS 100 may detect or receive user selection of the "fire" button, generate a conformation popup window over a portion of display view 600, detect or receive user selection of a "confirm fire" button in the confirmation popup, fire laser target marker 152 (e.g., according to a selected PRF code), render the crosshairs in display view 600 in red to indicate an active laser, and/or render the fire button in red and animated to indicate the remaining time in a corresponding dead-man countdown timer configured to end laser output and return laser target marker 152 to an armed state after a preselected time if no further user input is detected/received. In some embodiments, UAS 100 may detect or receive user selection of the laser fire button prior to the dead-man countdown timer expiring and then reinitialize the dead-man countdown timer while maintaining a fire state for laser target marker 152. In related embodiments, UAS 100 may detect or receive user selection of the stop button at any time and then disable laser target marker 152 or return laser target marker 152 to an armed state.

In some embodiments, UAS 100 may be configured to force arming laser target marker 152 prior to firing. In such embodiments, UAS 100 may be configured to detect or receive user selection of the "Arm" button, generate a laser user warning dialog or window (e.g., including warning information and/or additional information indicating recent safety setting modifications) over a portion of display view 600, detect or receive user selection of the "confirm arm" button in the laser user warning dialog, arm laser target marker 152, render the "Arm button" in green indicating system checks have passed and laser target marker 152 is ready for firing, and render status text above the "Arm button" to confirm the current armed state of laser target marker 152. In some embodiments, UAS 100 may be configured to detect or receive user selection of the "disarm" button and then return UAS 100 to a safe mode by disarming laser target marker 152.

Figure 6B:
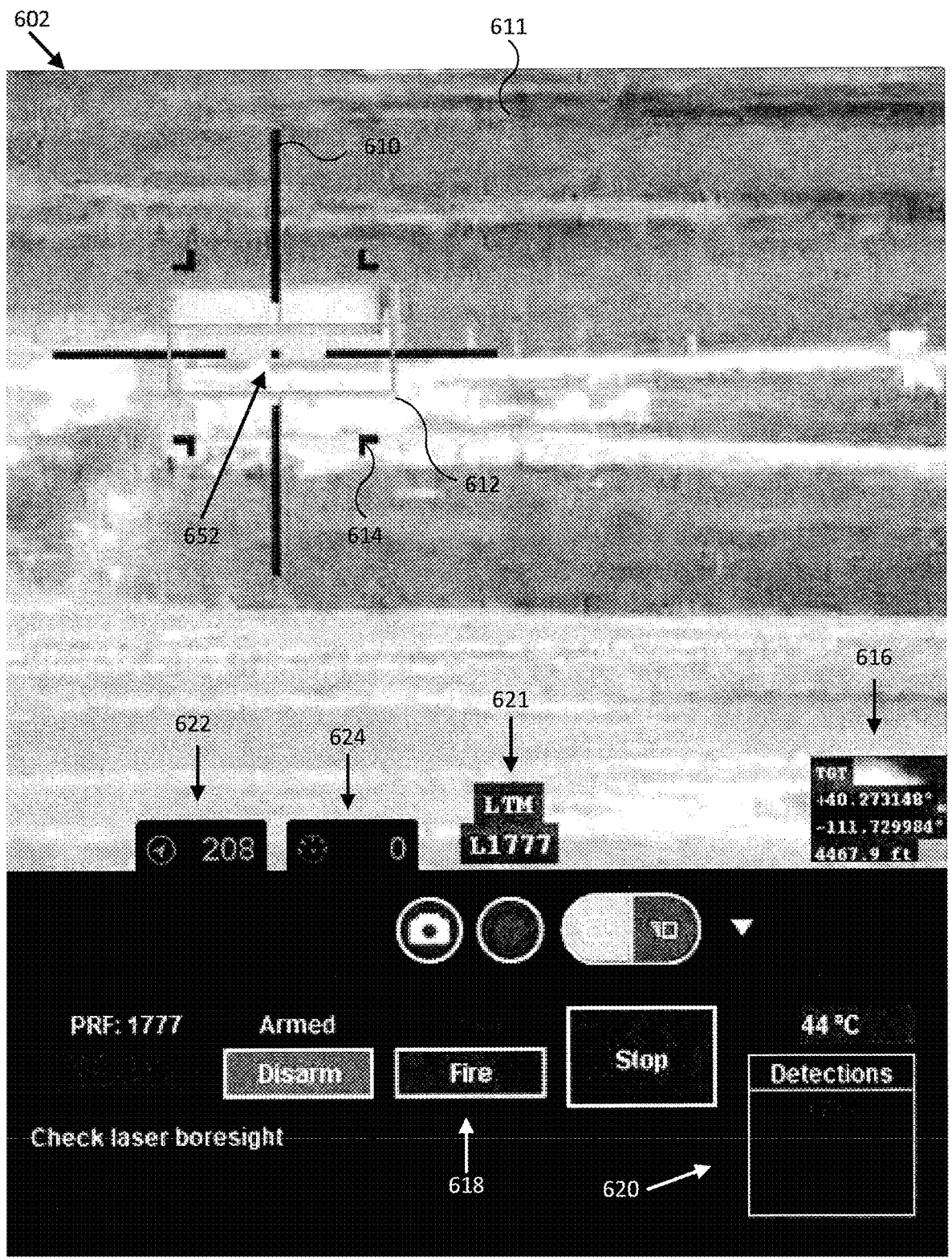

In FIG. 6B, display view 602 illustrates an operational display view for laser designator system 140. In particular, display view 602 illustrates how UAS 100 operates when in self-designation tracking and validation modes. For example, laser designator system 140 may be configured to generate confirmation of the PRF encoding of a laser beam generated by laser target marker 152, to provide boresight validation, and/or to confirm reflected energy, as described herein.

As described herein, laser spot tracker 156 may be configured to track multiple laser spots simultaneously, for example, such as up to 4 spots at once within its FOV. In general, laser spot tracker 156 may be configured to report PRF encoded laser spot angular positions and their respective PRF encodings, such as via a serial link to platform controller 142. For example, laser spot tracker 156 may be configured to output or provide (x,y angles) (angular positions), and platform controller 142 may be configured to convert the angular positions to pixel coordinates in imagery generated by one or more imaging modules of laser designator system 140, for example, and display such positions in user interface 132 as an overlay on LWIR imagery, similar to the display view shown in FIG. 6B. In some embodiments, UAS 100 and/or laser designator system 140 may be configured to provide automatic boresight calibration correction using a lookup table created during a factory calibration procedure, as described herein. Geolocation may be accomplished by the user indicating (e.g., by mouse cursor) over a laser spot indicator rendered in the LWIR imagery. The geolocation may be determined using algorithms that correlate pixel positions with geocoordinates using fused INS and GNSS data, for example, and/or terrain maps, motion sensor data, laser rangefinder data, and/or other sensor data, as described herein.

Under some circumstances, it can be technically challenging to self-designate due to laser airflash (laser energy reflecting of air causing false LST detections). Embodiments described herein address this issue by gating operation of laser spot tracker 156: laser target marker 152 may be configured to report when light emissions occur via a relatively low latency analog signal, referred to herein as a laser pulse trigger signal. Predictive algorithms may be used to disable laser spot tracker 156 during time periods when airflash is likely to occur.

For example, platform controller 142 may be configured to accomplished this during self lasing by: initially disabling light detection on laser spot tracker 156; laser target marker 152 reporting light emission events (rising edges of a 5 volt analog signal—the laser pulse trigger signal); laser spot tracker 156 and/or platform controller 142 detecting a rising edge and starting a high speed nanosecond timer; on the second rising edge, corresponding to a second laser emission event, the nanosecond clock is used to calculate a period between the pulses; the period is used to predict when follow-on laser emissions/pulses are likely to occur. Upon detection of the third rising edge emission event, laser spot tracker 156 will un-blank, and light detections will be enabled after an appropriate time window has elapsed and the risk of airflash false detections has elapsed. The end result is laser spot tracker 156 blanking for 350 meters of range (e.g., 350 light meters of time), thereby preventing airflash false detections, and enabling valid detections beyond 350 meters.

Display view 602 of FIG. 6B includes image data 611 (e.g., LWIR image data) accompanied by a variety of graphical overlays, including crosshairs 610, boresight alignment indicator 612, self-designated target indicator 652, self-designated target lock/target lit indicator 614, telemetry indicator 622, 624, laser type and PRF code indicator 621, PRF detections list box 620, target geolocation indicator 616, and Fire button 618 configured to control operation of laser target marker 152.

Figure 6C:
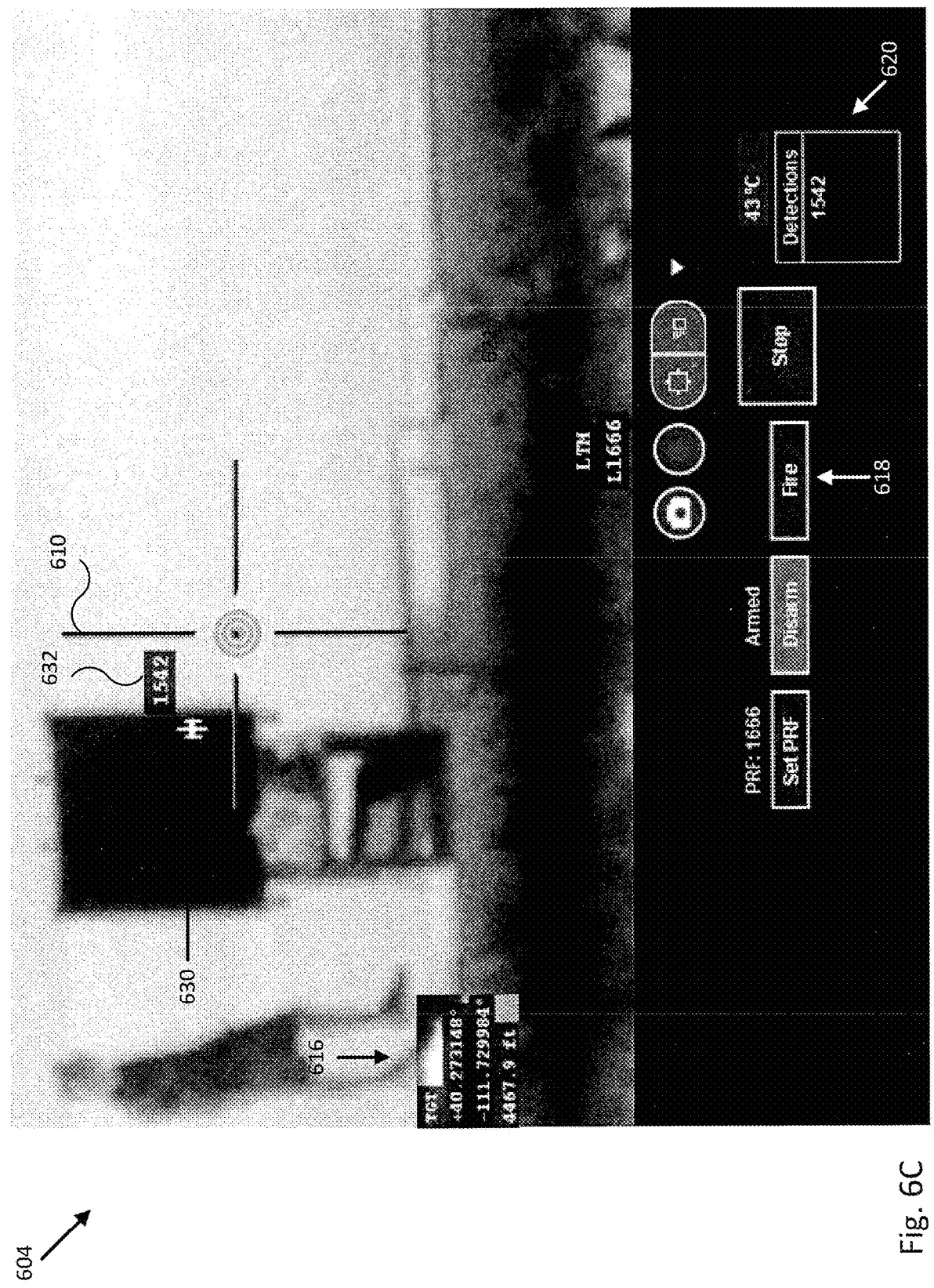

In FIG. 6C, display view 604 illustrates operation of laser designator system 140 when detecting $3^{rd}$ party laser designations within a monitored area. For example, display view includes PRF indicator 632 rendered adjacent detected 3rd party laser spot 630, along with various other graphical indicators identified in other display views. In various embodiments, display view 604 may be generated with multiple such 3rd party laser spots each with their own PRF encoding listed in box 620 and geolocated within display view 604, as shown.

In FIG. 6D, display view 606 illustrates a laser safety settings popup dialog or window where safety settings for laser designator system 140 are configured. In general, checked boxes indicate the setting is active, values next to each setting indicate the threshold that must be met before UAS 100 disables and/or turns off laser target marker 152, and greyed out boxes and values cannot be disabled or edited by a user while UAS 100 is in its present state.

In various embodiments, UAS 100 may be configured to detect or receive user selection of a gear symbol or settings button within display view 600, for example, and render a settings submenu including a variety of different themes of settings for UAS 100, including laser safety settings. UAS 100 may detect or receive user selection of a "Safety Settings" button and render the laser safety settings popup dialog or window shown in display view 606. In some embodiments, the laser safety settings popup dialog or window may be reached directly though other popup dialogs or windows, for example, and/or other buttons. UAS 100 may be configured to render each setting with a selectable box, a description, and an adjustable value. A checked box indicates whether the corresponding safety setting is currently active. Not all boxes can be un-checked per critical safety performance; these boxes will appear with greyed out check marks. The values listed to the right of each setting represent a limit that will trigger UAS 100 and/or laser designator system 140 to stop laser emissions. For example, if UAV 110 loses GNSS communication for longer than 5000 ms, UAS 100 will disable laser target marker 152 and laser target marker 152 will cease firing.

When a non-time-based value is violated, UAS 100 may be configured to initiate an internal countdown set by the "Laser safety shutoff delay" setting. laser target marker 152 will continue to fire until this clock expires. For example, when UAV 110 leaves its geofenced Home area, it will report the violation to the other elements of UAS 100; if UAV 110 is not moved to resolve the violation, laser target marker 152 will stop firing after 5 seconds, per the "Laser safety shutoff delay" setting.

In various embodiments, UAS 100 may be configured to recalculate or at least reevaluate the safety settings and/or status of UAV 110 and/or laser designator system 140 each time laser target marker 152 is armed or fired. Such process may include updating the 3D position of UAV 110 in the space relevant to the safety settings. This accounts for any changes in the position of UAV 110 and/or its home position during mission operation and between lasing events.

The following list gives more detail on each of the settings' description and behavior. Laser safety shutoff delay: If the laser is currently firing and one of the below safety checks is violated, the laser will continue to fire for the configured delay time. LRF range update timeout: If no range reports are received from the LRF within the configured timeout the laser will not fire. Aircraft telemetry timeout: If no telemetry is received from the aircraft within the configured timeout the laser will not fire. Aircraft 3D geofence radius: If the aircraft exits this radius from its initial firing position, the laser will not fire. This radius is updated each time the fire button is pressed. Aircraft minimum distance to home: The aircraft must be further from the home position than this value to be allowed to fire the laser. Target 2D geofence radius: Ground radius surround the target (crosshair position). If the laser points out of the configured radius, the laser will not fire.

Target minimum distance to home: The target must be further away from the home position than the configured value to be allowed to fire the laser. Maximum target elevation angle: The laser will not be allowed to fire if the laser is pointing above the configured angle. 0° represents the gimbal pointing straight down; 90° represents the gimbal pointing at the horizon. Check navigation state: Checks the aircraft reported navigation state; the following states do not allow for laser firing: Not—Airborne; Returning to home; Landing.

Figure 7:
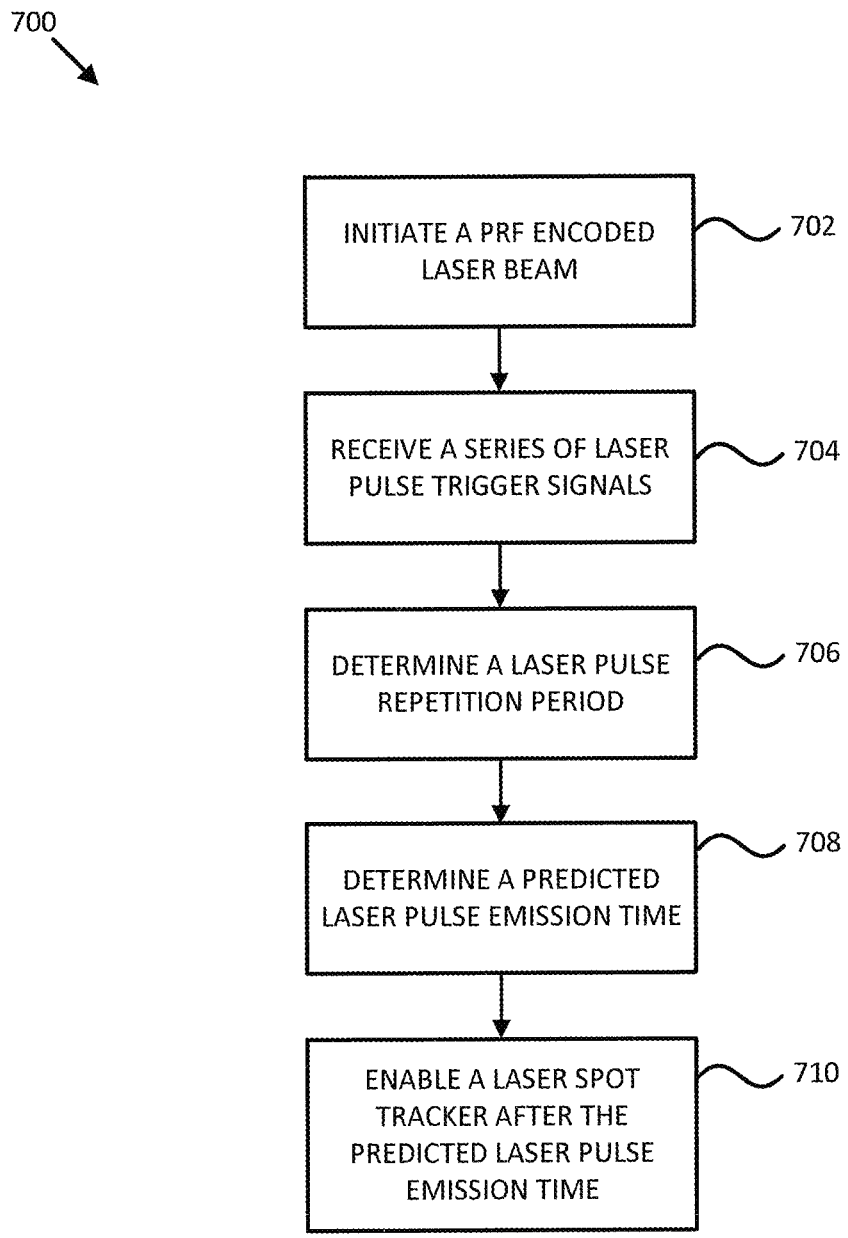
FIG. 7 illustrates a flow diagram of various operations to operate a laser designator system in accordance with an embodiment of the disclosure.

FIG. 7 illustrates a flow diagram 700 of various operations to operate laser designator system 140 in accordance with an embodiment of the disclosure. In some embodiments, the operations of FIG. 7 may be implemented as software instructions executed by one or more logic devices or controllers associated with corresponding electronic devices, sensors, and/or structures depicted in FIGS. 1-6C. More generally, the operations of FIG. 7 may be implemented with any combination of software instructions, mechanical elements, and/or electronic hardware (e.g., inductors, capacitors, amplifiers, actuators, or other analog and/or digital components). Any step, sub-step, sub-process, or block of process 700 may be performed in an order or arrangement different from the embodiment illustrated by FIG. 7. For example, in other embodiments, one or more blocks may be omitted from or added to process 700. Furthermore, block inputs, block outputs, various sensor signals, sensor information, calibration parameters, and/or other operational parameters may be stored to one or more memories prior to moving to a following portion of a corresponding process. Although process 700 is described with reference to systems described in FIGS. 1-6C, process 700 may be performed by other systems different from those systems and including a different selection of electronic devices, sensors, assemblies, mechanisms, platforms, and/or platform attributes.

At block 702, platform controller 142 controls laser target marker 152 to initiate generation of a PRF encoded laser beam. At block 704, platform controller 142 receives a series of laser pulse trigger signals (e.g., from laser target marker 152) corresponding to each pulse of the generated PRF encoded laser beam. In block 706, platform controller 142 determines a laser pulse repetition period between adjacent pulses of the PRF encoded laser beam based, at least in part, on the received series of laser pulse trigger signals. In block 708, platform controller 142 determines at least one predicted laser pulse emission time based, at least in part, on the determined laser pulse repetition period. In block 710, platform controller 142 enables laser spot tracker 156 after the predicted laser pulse emission time, such as at least 100 light meters after the predicted laser pulse emission time, between 100 and 400 light meters after the predicted laser pulse emission time, and/or approximately 300-350 light meters after the predicted laser pulse emission time, in order to reduce or eliminate risk of airflash detection errors, as described herein.

By providing such systems and techniques for laser designation, embodiments of the present disclosure substantially improve the operational flexibility and reliability of unmanned flight platforms. As such, embodiments provide UAV laser designator systems with significantly increased convenience and performance. For example, in some embodiments, laser designator system 140 may be used to automatically identify and track targets, such as people, vehicles, or both to highlight what is visible in a current monitored area.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A laser designator system for an unmanned aerial vehicle (UAV), the laser designator system comprising:
   an imaging module configured to image a scene according to a first field of view (FOV) of the imaging module;
   a laser target marker configured to generate and project a pulse repetition frequency (PRF) encoded laser beam towards the scene and within the first FOV of the imaging module;
   a laser spot tracker configured to detect a PRF encoded laser spot generated by the PRF encoded laser beam within the scene and provide an angular position of the PRF encoded laser spot within a second FOV of the laser spot tracker; and
   an optical datum faceplate coupled to and configured to optically align the imaging module, the laser target marker, and the laser spot tracker to each other and to a boresight for the laser designator system defined by the optical datum faceplate.

2. The laser designator system of claim 1, further comprising:
   a logic device configured to communicate with the imaging module, the laser target marker, and/or the laser spot tracker, wherein the logic device is configured to:
   disable the laser spot tracker;
   control the laser target marker to initiate the PRF encoded laser beam;
   receive a series of laser pulse trigger signals corresponding to each pulse of the PRF encoded laser beam;
   determine at least one laser pulse repetition period between adjacent pulses of the PRF encoded laser beam based, at least in part, on the received series of laser pulse trigger signals;
   determine at least one predicted laser pulse emission time based, at least in part, on the determined at least one pulse repetition period; and
   enable the laser spot tracker at least one hundred light-meters after the predicted laser pulse emission time, a light-meter being an amount of time it takes for light to travel a distance of one meter in vacuum.

3. The laser designator system of claim 2, wherein the determining the at least one predicted laser pulse emission time comprises:
   determining the at least one predicted laser pulse emission time based, at least in part, on the determined at least one laser pulse repetition period and a PRF encoding of the PRF encoded laser beam.

4. The laser designator system of claim 1, further comprising:
   a laser rangefinder coupled to the optical datum faceplate and configured to provide laser rangefinder data corresponding to the PRF encoded laser spot detected by the laser spot tracker; and
   a logic device configured to communicate with the imaging module, the laser target marker, the laser spot tracker, and/or the laser rangefinder, wherein the logic device is configured to:
   convert the angular position of the PRF encoded laser spot into a pixel position within image data generated by the imaging module; and
   determine a geolocation of the PRF encoded laser spot based, at least in part, on the laser rangefinder data provided by the laser rangefinder and/or the pixel position within the image data generated by the imaging module.

5. The laser designator system of claim 4, further comprising an orientation and/or position sensor (OPS) configured to provide an orientation and/or position associated with the laser designator system, wherein the logic device is configured to:
   determine a geolocation of the PRF encoded laser spot based, at least in part, on the laser rangefinder data provided by the laser rangefinder, the pixel position within the image data generated by the imaging module, and/or the orientation and/or position associated with the laser designator system provided by the OPS.

6. The laser designator system of claim 1, wherein the imaging module comprises a first infrared imaging module and the first FOV comprises a relatively wide FOV, the system further comprising:
a second infrared imaging module configured to image the scene according to a relatively narrow FOV disposed entirely within the relatively wide FOV of the first infrared imaging module, wherein the second infrared imaging module is coupled to the optical datum faceplate and optically aligned to the boresight of the laser designator system by the optical datum faceplate.

7. An unmanned aircraft system (UAS) comprising the laser designator system of claim 1, the UAS further comprising:
the UAV, wherein the laser designator system is coupled to the UAV via an actuated gimbal system; and
a base station associated with the UAV, wherein the base station is configured to:
receive image data generated by the imaging module of the laser designator system and the angular position of the PRF encoded laser spot;
convert the angular position of the PRF encoded laser spot into a pixel position within the image data generated by the imaging module;
determine a geolocation of the PRF encoded laser spot based, at least in part, on the pixel position within the image data generated by the imaging module and/or an orientation and/or position of the UAV; and
render a display view comprising the image data generated by the imaging module and at least one graphical element configured to indicate the geolocation of the PRF encoded laser spot within the scene.

8. A method of operating the laser designator system of claim 1, the method comprising:
disabling the laser spot tracker;
controlling the laser target marker to initiate the PRF encoded laser beam;
receiving a series of laser pulse trigger signals corresponding to each pulse of the PRF encoded laser beam;
determining at least one laser pulse repetition period between adjacent pulses of the PRF encoded laser beam based, at least in part, on the received series of laser pulse trigger signals;
determining at least one predicted laser pulse emission time based, at least in part, on the determined at least one pulse repetition period; and
enabling the laser spot tracker after the predicted laser pulse emission time.

9. The method of claim 8, wherein the enabling the laser spot tracker occurs at least one hundred light-meters after the predicted laser pulse emission time, a light-meter being an amount of time it takes for light to travel a distance of one meter in vacuum.

10. The method of claim 9, wherein the determining the at least one predicted laser pulse emission time is based, at least in part, on the determined at least one laser pulse repetition period and a PRF encoding of the PRF encoded laser beam.

11. The method of claim 8, further comprising:
providing laser rangefinder date corresponding to the PRF encoded laser spot detected by the laser spot tracker, and
converting the angular position of the PRF encoded laser spot into a pixel position within image data generated by the imaging module; and
determining a geolocation of the PRF encoded laser spot based, at least in part, on the laser rangefinder data provided by the laser rangefinder and/or the pixel position within the image data generated by the imaging module.

12. A laser designator system for an unmanned aerial vehicle (UAV), the laser designator system comprising:
an imaging module configured to image a scene according to a first field of view (FOV) of the imaging module;
a laser spot tracker configured to detect a plurality of pulse repetition frequency (PRF) encoded laser spots disposed within the scene and to provide a corresponding plurality of angular positions of the plurality of PRF encoded laser spots within a second FOV of the laser spot tracker; and
an optical datum faceplate coupled to and configured to optically align the imaging module and the laser spot tracker to each other and a boresight for the laser designator system defined by the optical datum faceplate.

13. The laser designator system of claim 12, further comprising:
an orientation and/or position sensor (OPS) configured to provide an orientation and/or position associated with the laser designator system; and
a logic device configured to communicate with the imaging module, the laser spot tracker, and/or the OPS, wherein the logic device is configured to:
convert the plurality of angular positions corresponding to the plurality of PRF encoded laser spots into a corresponding plurality of pixel positions within image data generated by the imaging module; and
determine a plurality of geolocations corresponding to the plurality of PRF encoded laser spots based, at least in part, on the orientation and/or position associated with the laser designator system provided by the OPS and/or the plurality of pixel positions within the image data generated by the imaging module.

14. The laser designator system of claim 13, further comprising a laser rangefinder coupled to the optical datum faceplate and configured to provide laser rangefinder data corresponding to at least one of the plurality of PRF encoded laser spots detected by the laser spot tracker, wherein the logic device is configured to:
determine the plurality of geolocations corresponding to the plurality of PRF encoded laser spots based, at least in part, on the laser rangefinder data provided by the laser rangefinder, the plurality of pixel positions within the image data generated by the imaging module, and/or the orientation and/or position associated with the laser designator system provided by the OPS.

15. A method comprising:
controlling a laser target marker to initiate a pulse repetition frequency (PRF) encoded laser beam;
receiving a series of laser pulse trigger signals corresponding to each pulse of the PRF encoded laser beam;
determining at least one laser pulse repetition period between adjacent pulses of the PRF encoded laser beam based, at least in part, on the received series of laser pulse trigger signals;
determining at least one predicted laser pulse emission time based, at least in part, on the determined at least one laser pulse repetition period;

disabling a laser spot tracker from detecting the PRF encoded laser beam during at least one hundred light-meters after the predicted laser pulse emission time, a light-meter being an amount of time it takes for light to travel a distance of one meter in vacuum; and enabling the laser spot tracker at least one hundred light-meters after the predicted laser pulse emission time to detect reflections of the PRF encoded laser beam.

16. The method of claim 15, wherein the determining the at least one predicted laser pulse emission time is based, at least in part, on the determining at least one laser pulse repetition period and a PRF encoding of the PRF encoded laser beam.

17. The method of claim 16, further comprising:
detecting a PRF encoded laser spot generated by the PRF encoded laser beam;
providing laser rangefinder data corresponding to the PRF encoded laser spot;
converting an angular position of the PRF encoded laser spot into a pixel position within image data; and
determining a geolocation of the PRF encoded laser spot based, at least in part, on the laser rangefinder data and/or the pixel position within the image data generated by the imaging module.

18. An unmanned aircraft system (UAS) configured to perform the method of claim 15, the UAS further comprising:
an imaging module configured to image a scene according to a first field of view (FOV) of the imaging module;
the laser target marker configured to generate and project the PRF encoded laser beam towards the scene and within the first FOV of the imaging module;
a laser spot tracker configured to detect a PRF encoded laser spot generated by the PRF encoded laser beam within the scene and provide an angular position of the PRF encoded laser spot within a second FOV of the laser spot tracker; and
an optical datum faceplate coupled to and configured to optically align the imaging module, the laser target marker, and the laser spot tracker to each other and to a boresight for the laser designator system defined by the optical datum faceplate.

19. The method of claim 15, comprising:
disabling the laser spot tracker from detecting the laser beam during at least two hundred light-meters after the predicted laser pulse emission time; and
enabling the laser spot tracker at least two hundred light-meters after the predicted laser pulse emission time to detect reflections of the PRF encoded laser beam.

20. The method of claim 15, comprising:
disabling the laser spot tracker from detecting the laser beam during at least three hundred light-meters after the predicted laser pulse emission time; and
enabling the laser spot tracker at least three hundred light-meters after the predicted laser pulse emission time to detect reflections of the PRF encoded laser beam.

* * * * *

UNITED STATES PATENT AND TRADEMARK OFFICE
CERTIFICATE OF CORRECTION

PATENT NO. : 12,480,763 B2
APPLICATION NO. : 17/492542
DATED : November 25, 2025
INVENTOR(S) : Matthew Titensor, Nathan Knoebel and Jerel B. Nielsen Page 1 of 1

It is certified that error appears in the above-identified patent and that said Letters Patent is hereby corrected as shown below:

In the Specification

In the DETAILED DESCRIPTION:

Column 3, Line 50, change "designator system. In Additional embodiments may be" to --designator system. Additional embodiments may be--

Column 5, Line 52, change "110, for example (e.g., or an element of platform 110, based" to --110, for example or an element of platform 110, based--

Column 10, Line 14, change "overlay may change to be proceeded preceded with an "I" to" to --overlay may change to be preceded with an "I" to"--

Signed and Sealed this
Twenty-seventh Day of January, 2026

John A. Squires
*Director of the United States Patent and Trademark Office*